US011776048B2

(12) United States Patent
Bhattacharya et al.

(10) Patent No.: US 11,776,048 B2
(45) Date of Patent: *Oct. 3, 2023

(54) SYSTEMS, NON-TRANSITORY COMPUTER-READABLE MEDIUMS, AND METHODS FOR PROVIDING A USER INTERFACE FOR AN ELECTRONIC TRANSACTIONS PLATFORM

(71) Applicant: CaaStle, Inc., New York, NY (US)

(72) Inventors: Arnab Bhattacharya, Cupertino, CA (US); Georgiy Goldenberg, Los Altos, CA (US); Christine M. Hunsicker, New York, NY (US); David Sabel, Saratoga, CA (US); Tyler Young, San Jose, CA (US); Lei Yu, Cupertino, CA (US)

(73) Assignee: CAASTLE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,793

(22) Filed: Sep. 16, 2022

(65) Prior Publication Data
US 2023/0015747 A1    Jan. 19, 2023

Related U.S. Application Data

(63) Continuation of application No. 17/326,775, filed on May 21, 2021, now Pat. No. 11,481,833.

(51) Int. Cl.
*G06Q 30/00* (2023.01)
*G06Q 30/0601* (2023.01)
*G06Q 10/083* (2023.01)

(52) U.S. Cl.
CPC ....... *G06Q 30/0643* (2013.01); *G06Q 10/083* (2013.01); *G06Q 30/0625* (2013.01); *G06Q 30/0635* (2013.01)

(58) Field of Classification Search
CPC .......... G06Q 30/0643; G06Q 30/0625; G06Q 30/035; G06Q 10/083
(Continued)

(56) References Cited

U.S. PATENT DOCUMENTS 10,121,135 B1    11/2018  Foroohar
10,776,723 B1     9/2020  Hopkins
(Continued)

OTHER PUBLICATIONS

Nishimura, K. (2021). Ralph lauren wades into the sharing economy with rental debut. Sourcing Journal (Online), Retrieved from https://www.proquest.com/trade-journals/ralph-lauren-wades-into-sharing-economy-with/docview/2496244725/se-2 (Year: 2021).*
(Continued)

*Primary Examiner* — Arielle E Weiner
(74) *Attorney, Agent, or Firm* — Bookoff McAndrews, PLLC

(57) ABSTRACT

A computer-implemented method for providing a user interface to a user includes receiving wearable article data describing wearable articles for physical shipment to users via electronic interactions; generating a user interface for an electronic transactions platform based at least on the received wearable article data; causing display of the user interface depicting one or more of the wearable articles; receiving a selection of a wearable article of the displayed one or more wearable articles via the user interface; determining a condition of the selected wearable article at least based on the received wearable article data in response to the selection; reserving the selected wearable article for a predetermined period of time in response to the selection; updating and causing display of the user interface depicting the selected wearable article and the determined condition; and determining whether the selected wearable article is purchased or borrowed during the predetermined period of time.

20 Claims, 16 Drawing Sheets

(58) Field of Classification Search
USPC .......................................................... 705/27.2
See application file for complete search history.

(56) References Cited

U.S. PATENT DOCUMENTS

| | | | |
|---|---|---|---|
| 10,878,486 B1 | 12/2020 | Aflalo et al. | |
| 2003/0040928 A1* | 2/2003 | Kasahara | G06Q 30/06 |
| | | | 705/307 |
| 2013/0151371 A1* | 6/2013 | Moss | G06Q 30/0633 |
| | | | 705/26.8 |
| 2014/0331252 A1 | 11/2014 | Jin | |
| 2016/0063587 A1* | 3/2016 | Fry | G06Q 30/0643 |
| | | | 705/26.5 |
| 2017/0004567 A1 | 1/2017 | Dutt | |
| 2017/0243282 A1 | 8/2017 | Koulis et al. | |
| 2018/0182016 A1* | 6/2018 | Giampaolo | G06Q 30/0641 |
| 2019/0244143 A1 | 8/2019 | Habuta | |
| 2020/0380586 A1 | 12/2020 | Francois | |
| 2021/0118044 A1* | 4/2021 | Kou | G06Q 30/0645 |
| 2021/0201336 A1 | 7/2021 | Mallett | |
| 2021/0312539 A1* | 10/2021 | Imafuku | G06Q 20/403 |

OTHER PUBLICATIONS

Nishimura, K. (2021). Ralph lauren wades into the sharing economy with rental debut. Sourcing Journal (Online), Retrieved from https://www.proquest.com/trade-journals/ralph-lauren-wades-into-sharing-economy-with/docview/2496244725/se-2.

* cited by examiner

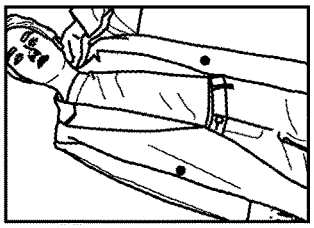

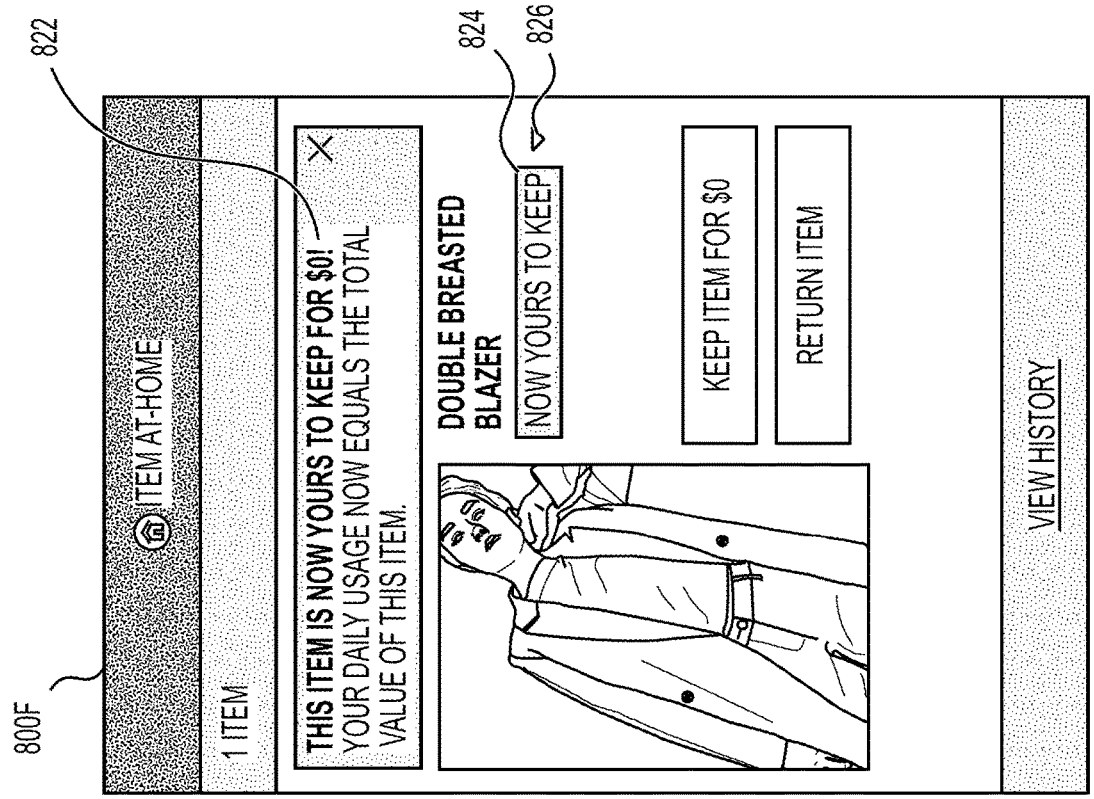
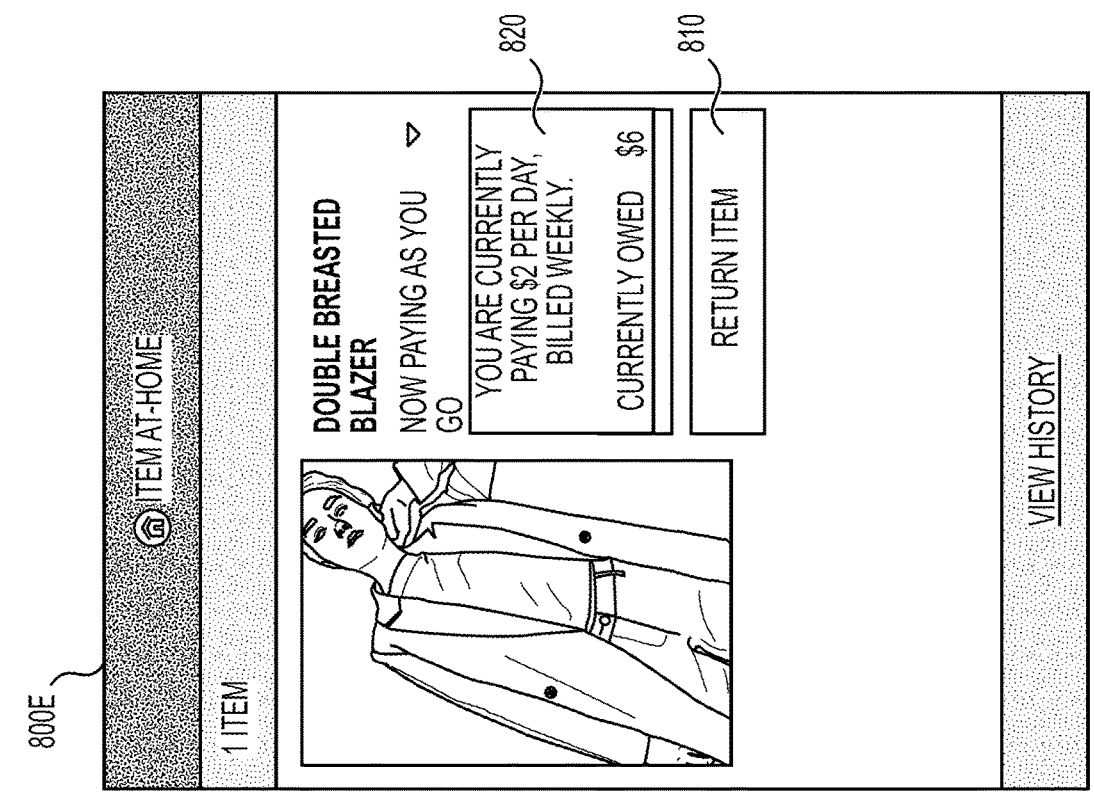
FIG. 8F
FIG. 8E

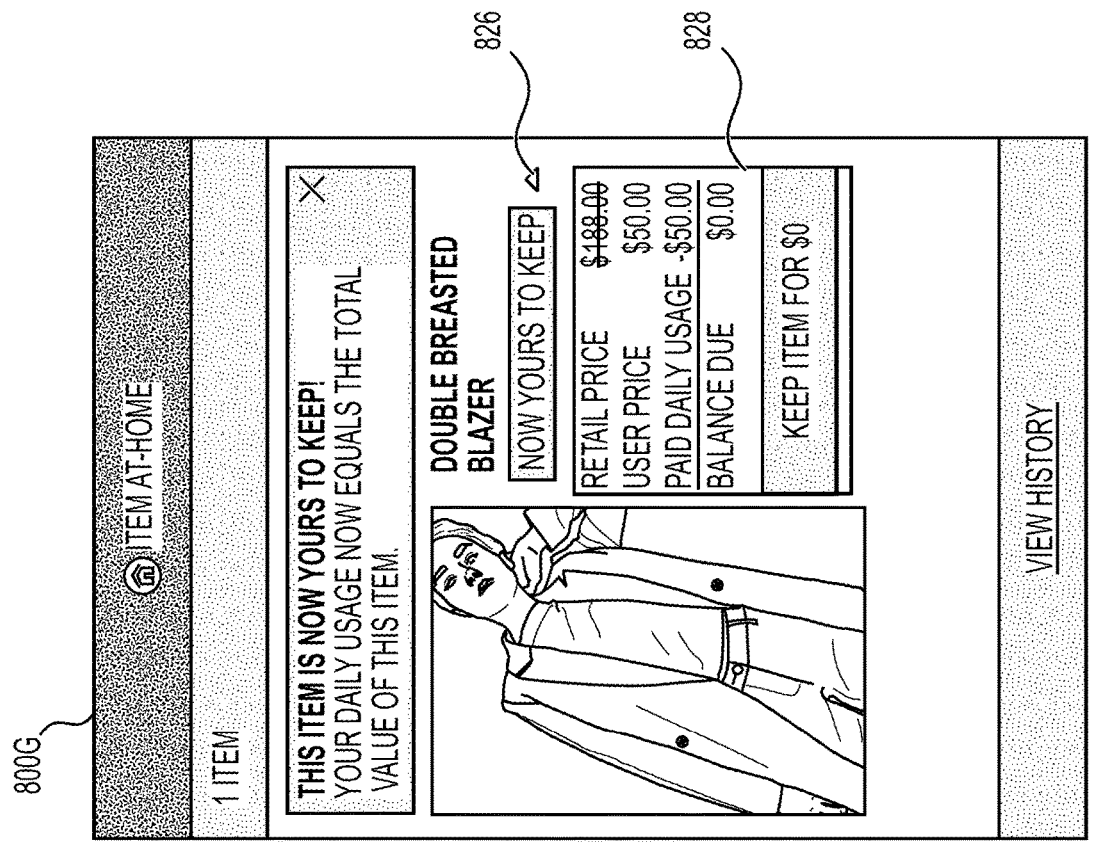

SYSTEMS, NON-TRANSITORY COMPUTER-READABLE MEDIUMS, AND METHODS FOR PROVIDING A USER INTERFACE FOR AN ELECTRONIC TRANSACTIONS PLATFORM

CROSS-REFERENCE TO RELATED APPLICATION(S)

This application is a continuation of, and claims the benefit of priority to, pending U.S. application Ser. No. 17/326,775, filed May 21, 2021, the entirety of which is incorporated herein by reference.

TECHNICAL FIELD

Aspects of the present disclosure relate to providing a user interface for an electronic transactions platform and, more particularly, to a user interface for an electronic transactions platform associated with articles, such as wearable items.

BACKGROUND

Services for providing articles, including electronically-presented services, typically adhere to an established, conventional structure. In these services, entities such as retailers design and manufacture, or otherwise obtain, a series of products that are offered for purchase. In the example of wearable articles including garments, a group of products can be offered for a period of time, such as a season, after which the articles are offered at a reduced price. Entities offering articles via one or more electronic destinations, such as a website, employ conventional allocation strategies, allotting each individual article to a particular purpose. For example, articles are allocated for purchase so that when stock of a particular article is exhausted, the website can be updated appropriately. When a large number of articles are present (e.g., unsold) after a period of time, the website or other electronic destination, can be updated with a reduced price to encourage selection of these articles. Each article, and often the electronic destination itself, is typically dedicated to a specific purpose, such as one-time purchases, auction-style purchases, rentals, etc.

While article subscriptions have recently experienced increased visibility and market importance, there are circumstances where a one-time rental system is desirable. However, implementing new systems, to enable a new service, presents numerous technical challenges that involve significant design efforts and infrastructure to support new inventory systems, user experience design, cost structure, and others. Thus, conventional systems lack the capabilities to flexibly and dynamically link a plurality of service types (e.g., one-time purchases, one-time rentals, and/or subscription services), guide a user through a plurality of different interfaces associated with a plurality of different entities, identify different users across these services, and facilitate interactions between different types of entities involved in management of these services. Additionally, transitions between different services are often jarring, and lead to user frustration, or even cause a user to abandon a planned interaction.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for providing a user interface associated with a plurality of services, such as services associated with wearable items or other articles offered by a plurality of entities, including entities having different roles (e.g., hosting entities, fulfiller entities, and others).

In one aspect, a computer-implemented method for providing a user interface to a user may include receiving, by one or more processors, wearable article data describing wearable articles for physical shipment to users via electronic interactions. The method may include generating, by the one or more processors, a user interface for an electronic transactions platform based at least on the received wearable article data. The method may include cause display, by the one or more processors, of the user interface depicting one or more of the wearable articles. The method may include receiving, by the one or more processors, a selection of a wearable article of the displayed one or more wearable articles via the user interface. The method may include determining, by the one or more processors, a condition of the selected wearable article at least based on the received wearable article data in response to the selection. The method may include reserving, by the one or more processors, the selected wearable article for a predetermined period of time in response to the selection. The method may include updating and causing display, by the one or more processors, of the user interface depicting the selected wearable article and the determined condition. The method may include determining, by the one or more processors, whether the selected wearable article is purchased or borrowed during the predetermined period of time.

In another aspect, a computer system for providing a user interface to a user may include a memory having processor-readable instructions stored therein and one or more processors configured to access the memory and execute the processor-readable instructions. The processor-readable instructions, when executed by the one or more processors may configure the one or more processors to perform a plurality of functions. The functions may include functions for receiving wearable article data describing wearable articles for physical shipment to users via electronic interactions. The functions may include functions for generating a user interface for an electronic transactions platform based at least on the received wearable article data. The functions may include functions for causing display of the user interface depicting one or more of the wearable articles. The functions may include functions for receiving a selection of a wearable article of the displayed one or more wearable articles via the user interface. The functions may include functions for determining a condition of the selected wearable article at least based on the received wearable article data in response to the selection. The functions may include functions for reserving the selected wearable article for a predetermined period of time in response to the selection. The functions may include functions for updating and causing display of the user interface depicting the selected wearable article and the determined condition. The functions may include functions for determining whether the selected wearable article is purchased or borrowed during the predetermined period of time.

In yet another aspect, a non-transitory computer-readable medium may contain instructions for performing functions for providing a user interface to a user. The functions may include receiving wearable article data describing wearable articles for physical shipment to users via electronic interactions. The functions may include generating a user interface for an electronic transactions platform based at least on the received wearable article data. The functions may include causing display of the user interface depicting one or more of the wearable articles. The functions may include receiving a selection of a wearable article of the displayed one or more wearable articles via the user interface. The functions may include determining a condition of the selected wearable article at least based on the received wearable article data in response to the selection. The functions may include reserving the selected wearable article for a predetermined period of time in response to the selection. The functions may include updating and causing display of the user interface depicting the selected wearable article and the determined condition. The functions may include determining whether the selected wearable article is purchased or borrowed during the predetermined period of time.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 7A-7F and 8A-8G depict exemplary user interfaces according to some embodiments.

DETAILED DESCRIPTION OF EMBODIMENTS

Figure 1:
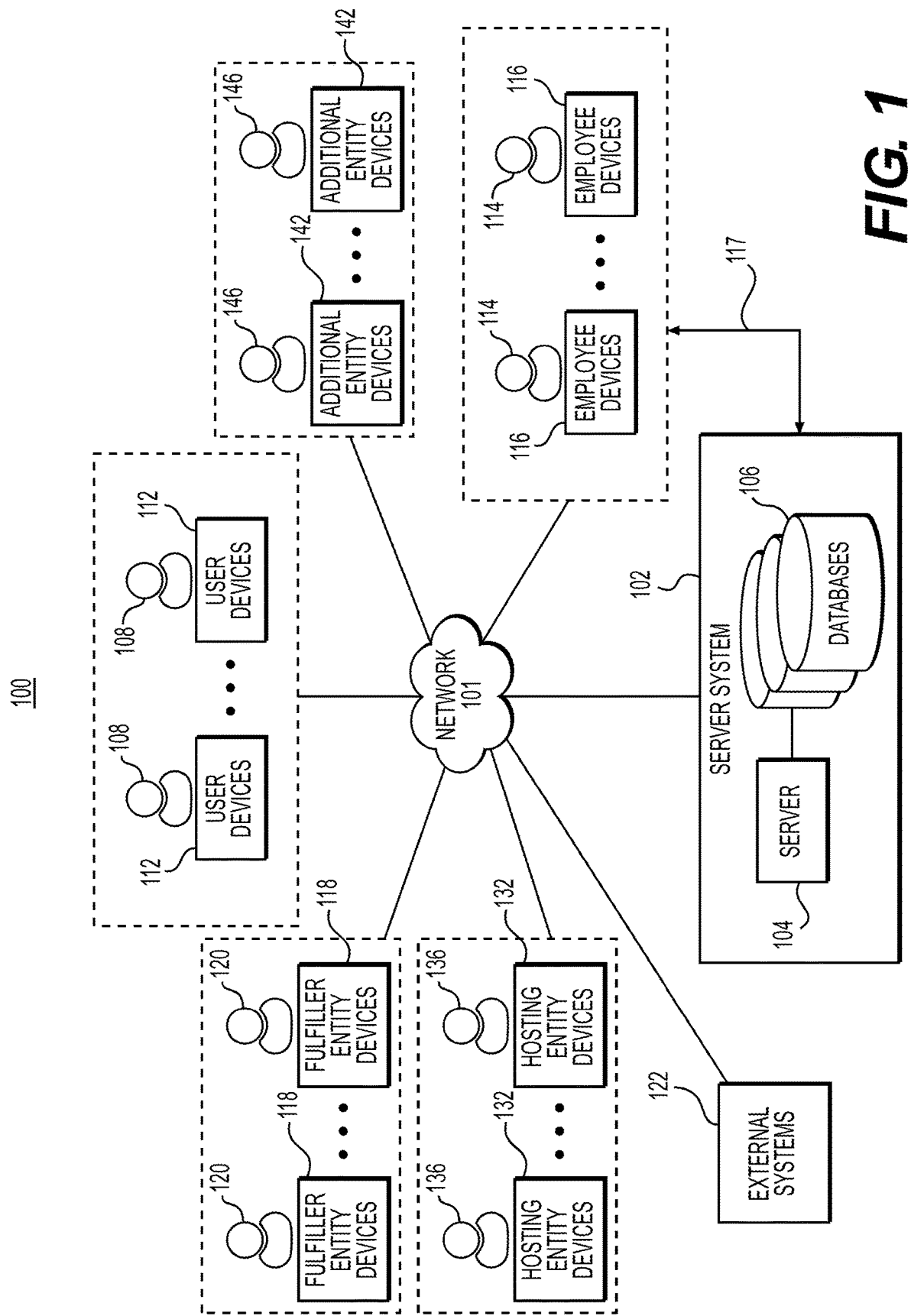
FIG. 1 is a block diagram of an exemplary environment in which methods, systems, and other aspects of the present disclosure may be implemented.

The following embodiments describe systems and methods for dynamically managing a user experience associated with articles, such as apparel or other wearable items associated with purchase services, rental services, and/or subscription services. In particular, aspects of the present disclosure may relate to systems and methods for managing a user experience for a plurality of entities in which one or more articles are made available for selection by a user interacting with an interface provided on behalf of a hosting entity.

While the exemplary system architecture as described in the present disclosure relates to electronic transactions for subscribing to, purchasing, or renting wearable items (e.g., by offering clothing-as-a-service (CaaS) of other articles-as-a-service, a Try-Then-Buy (TTB) service such as a service for renting an article for a set or flexible period of time with the option to purchase the article at a discounted TTB price, transaction rental services, etc.), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary interactions (e.g., transactions) as transactions pertaining to "apparel," "garments," "wearable articles," or "wearable items," all of those transactions may effectively serve any article or consumer good without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, transaction rental services, account management, marketing, customer service, warehouse operations, etc.). As used in the present disclosure, the terms "wearable item" and/or "wearable article" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining garments that should be assigned and shipped to one or more particular users. "Allocating" or "allocation" may also refer to computer-implemented operations for determining garments that should be assigned to one or more pools or groups of articles made available for selection by a user via a transaction rental service. An "inventory" may refer to a plurality of articles that are associated with one or more entities. A "catalog" may refer to a plurality of articles associated with one or more entities, such as one or more articles presented via an electronic storefront and/or via an interface of an inventory exchange. The term "physical inventory" includes articles physically provided to a logistics center, warehouse, or one or more other location(s).

In accordance with the present disclosure, user interfaces, periodically executed computer-implemented services, ad hoc services, and automations being integrated together in a connected platform may be achieved by a uniquely configured system architecture, configuring one or more processors to perform storefront and back office tasks, and various user interfaces providing specialized or customized access to entities associated with one or more roles. For example, the system may collect vast amounts of information and data attributes from historical transactions with users, historical transactions or other interactions, form data sets indicative of different entities' relationships with certain articles and/or other entities, etc. These interfaces, services, and automations may be useful for operating and managing an article transaction rental service and synchronizing information between the storefronts associated with the various entities with an inventory availability and valuation service.

Article merchants of all types, and in particular, apparel retailers, invest significant resources developing effective systems to facilitate article interactions, including article purchases. However, many systems, and indeed numerous industries including the apparel, jewelry, and other consumer products industries, to name a few, remain ownership-based, such that users purchase individual articles by navigating a website, in a manner that is analogous to interacting with a physical retail location. Due to this ownership-based model, a user's purchasing power limits access to articles that are offered for sale by article merchants. Thus, end-users are unable to access articles that will be used a limited number of times and/or that have a relatively high cost. Systems and methods described herein may, in at least some embodiments, allow end-users to access articles at a fraction of the purchase cost, retain the article as long as desired, and purchase the article when desired. Additionally, as users have become more value-conscious, a rental option is desirable in many circumstances. In some embodiments, entities may, by use of the disclosed methods and systems, create new monetization channels for their article(s), The channels may result in either or both an increase in or more consistent and predictable demand. Additionally, in at least some embodiments, entities may benefit from increased user retention, which may facilitate increased brand loyalty which would otherwise be reduced when user purchasing power is reduced.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond or in addition to an explicitly stated meaning. Likewise, the phrase "in one embodiment" as used herein does not necessarily refer to the same embodiment or aspect of the disclosure and the phrase "in another embodiment" as used herein does not necessarily refer to a different embodiment or aspect of the disclosure. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

I. Exemplary System Environment

FIG. 1 shows an example environment 100, according to one or more embodiments of the present disclosure. As shown, the example environment 100 may include one or more networks 101 that interconnect a server system 102, user devices 112, employee devices 116, entity devices 118, 132, 142, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and entity devices 118, 132, 142 may be accessed by different entity entities 120, 136, 146, as described below. In some implementations, employee devices 116 may be used to perform or supplement the functions of entity devices 118, 132, 142 and/or the functions of user devices 112. A server system 102 may comprise one or more servers 104 and one or more databases 106, which may be configured to store and/or process a plurality of data, microservices, and service components, and/or associated functions thereof, as described in more detail below with respect to FIGS. 2 and 3.

Users 108 may access server system 102 through the one or more networks 101 via user devices 112. Each device among user devices 112 may be any type of computing device (e.g., personal computing device, mobile computing device, etc.) which allows users 108 to display a web browser or a web-based application for accessing the server system 102 through the network 101. User devices 112 may, for example, be configured to display a web browser, a web-based application, or any other user interface (e.g., one or more mobile applications) for allowing users 108 to exchange information with other device(s) or system(s) in environment 100 over the one or more networks 101. For example, user devices 112 may load an application with a graphical user interface (GUI), and the application may display, on the GUI, one or more article recommendations for closeting and/or for transaction rental by the user. Users 108 accessing user devices 112 may be, for example, users and/or potential users of articles made available for subscription-based, transaction rental-based, and/or purchase-based distribution via electronic transactions and physical shipment. Additionally, or alternatively, users 108 may access user devices 112 to, for example, view articles that were ordered as part of a transaction rental service, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with server system 102, and/or external systems 122. In at least one embodiment, employee devices 116 are owned and operated by the same entity or at least an affiliate of the entity operating the e-commerce (e.g., CaaS) business hosted on server systems 102. Each employee device 116 may be any type of computing device (e.g., personal computing device, mobile computing devices, etc.). Employee devices 116 may allow employees 114 to display a web browser or an application for accessing the server system 102 and/or the external systems 122, through the one or more networks 101. For example, an employee device 116 may load an application with graphical user interface (GUI), and the application may display on the GUI one or more warehouse operations associated with providing CaaS to users 108. In some implementations, employee devices 116 may communicate directly with server system 102 via communications link 117, bypassing public networks 101. Additionally, or alternatively, employee devices 116 may communicate with server system 102 via network 101 (e.g., access by web browsers or web-based applications).

Entity devices 118, 132, 142 may be configured to be accessed by one or more entities, such as one or more fulfiller entities 120, one or more hosting entities 136 associated with a hosted electronic storefront for article transactions (e.g., purchases), and/or one or more additional entities 146, which may include fulfiller entities, hosting entities, and/or entities that act as both hosting and fulfillment entities, as described below. A fulfiller entity 120 may include, in at least some implementations, a "tenant" entity that interacts with a CaaS operator to engage one or more subscribing users and offer articles as part of a service (e.g., a subscription service) to participants in the service (e.g., users 108). However, fulfiller entities 120 are not necessarily tenants of associated with a CaaS operator.

Each device among the devices 118, 132, 142 may be any type of computing device (e.g., personal computing device, mobile computing devices, etc.). As used herein, each entity, including one or more entities 120, 136, 146, may refer to an entity that receives, supplies, shares, and/or facilitates article interactions, including one-time rentals, purchases, and/or subscription operations, for one or more collections of apparel or other articles. For example, fulfiller entities 120 and/or additional entities 146 may include one or more entities that offer a subscription service or other CaaS. The collections of apparel or other articles may be included as part of one or more CaaS inventories or one or more separate inventories to facilitate an article integration service that allows entities 120, 136, 146 to implement a transaction rental system. For example, each entity 120, 136, 146 may be a retailer, a designer, a manufacturer, a merchandiser, a brand owner, or other entity that supplies or otherwise makes available one or more collections (e.g., catalogs) of wearable items to one or more CaaS inventories managed and/or accessed by the server system 102.

Entities 120, 136, 146 may be configured to interact with each other, via an article integration service, according to one or more roles, as described below. For example, fulfillment or fulfiller entities 120 may be entities that provide a plurality of articles to one or more physical inventories of a CaaS, and ultimately, for use by other entities, such as one or more hosting entities 136. In some embodiments, fulfiller entities 120 may provide one or more articles directly to one or more hosting entities 136 and/or one or more users 108 associated with one or more hosting entities 136.

Hosting entities 136 may, via one or more electronic storefronts, make articles available to one or more users 108. These electronic storefronts may be configured as storefronts for purchasing articles. It should be appreciated that an entity may not always be a "fulfiller entity" vs. a "hosting entity." Rather, an entity may be a fulfiller vs. hosting entity depending on which side of a transaction the entity is on, for any given transaction. It is contemplated that, at any given moment, an entity may be a "hosting entity" with respect to a first transaction involving a first entity, while simultaneously acting as a "fulfiller entity" with respect to a second transaction involving a second entity. Additional entities 146 may include entities that act as both fulfiller and hosting entities 120, 136, and/or entities that facilitate article integration in electronic storefront catalogs of a plurality of entities (e.g., one or more fulfiller entities 120 and one or more hosting entities 136).

As described in more detail below with respect to FIG. 3, entities 120, 136, 146 may use one or more electronic entity interfaces (e.g., a catalog content management system associated with each entity) to provide server system 102 with wearable item data that describe apparel or wearable items made available for allocation across one or more inventories via server system 102. For example, one or more catalogs for each of the one or more entities 120, 136, 146 may be generated and/or updated at the server system 102 dynamically and/or periodically. Server system 102 may further facilitate services for making one or more articles available for transaction rentals) via a storefront for one or more hosting entities 136. For example, one or more articles may be designated or selected for inclusion in a pooled inventory, where such articles may be offered for a transaction rental service via one or more electronic storefronts associated with hosting entities 136, as described below. At least one of these articles may be offered in another service (e.g., a subscription service and/or an expedited system component of the subscription service) in addition to the transaction rental service, and thus may be considered to be "pooled" between the two services. While the multiple services associated with one or more pooled articles may be offered by different entities (e.g., a fulfiller entity 120 that offers one or more articles for selection as part of a subscription service and a hosting entity 136 that offers transaction rentals via articles in an inventory for the subscription service of the fulfiller entity 120), in some implementations the multiple services may be associated with a single entity (e.g., a single fulfiller or hosting entity 120, 136).

Devices 118, 132, 142 may serve as access terminals for the entities 120, 136, 146 for communicating with electronic interfaces and/or other subsystems hosted at server system 102. Entity devices 118, 132, 142 may, for example, be configured to display a web browser, an application, or any other user interface for allowing entities 120, 136, 146 to load electronic interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIGS. 2 and 3. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of devices 118, 132, 142, in addition to their own functions.

II. Exemplary Architecture

Figure 2:
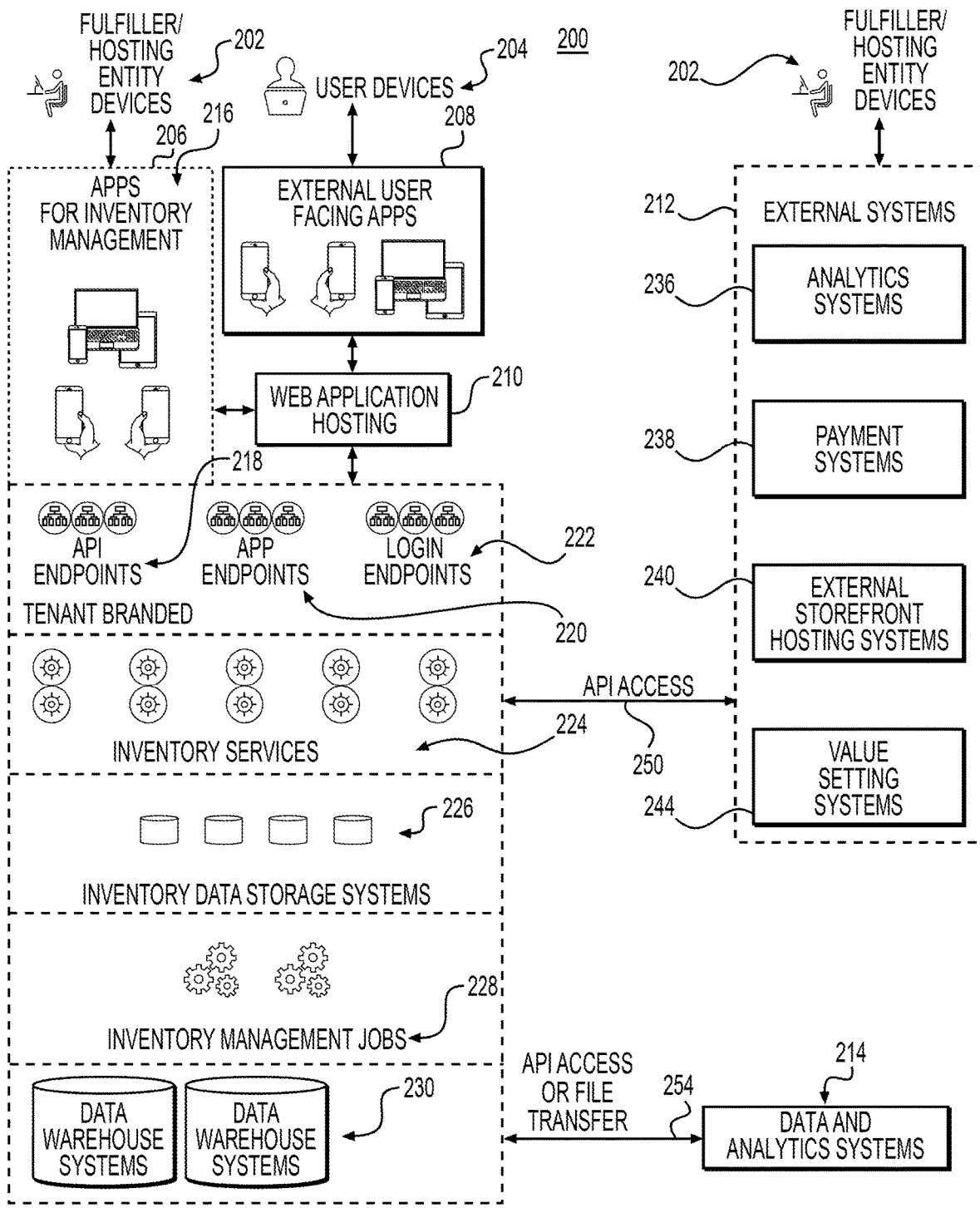
FIG. 2 is a schematic diagram depicting an architecture of an exemplary environment for dynamically-updateable shared inventories of articles, such as wearable items, of an electronic platform for offering the articles as a service, according to one or more embodiments.

FIG. 2 is a schematic diagram of an exemplary architecture 200 for an electronic platform for offering clothing-as-a-service and/or articles-as-a-service utilizing article integration service(s), according to one or more embodiments. The components of architecture 200 may be accessed by authorized terminals, such as fulfiller/hosting entity devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, user devices 204 may correspond to any one or more user devices 112 of users 108 depicted in FIG. 1. One or more of the employee devices 116 depicted in FIG. 1 may also access architecture 200 (e.g., via one or more internal applications). Fulfiller/hosting devices 202 may correspond to devices 118 of fulfiller entities 120, devices 132 of hosting entities 136, and/or devices 142 of additional entities 146. Devices 202 may, in at least some circumstances, also correspond to one or more employee devices 116.

As shown in FIG. 2, in general, architecture 200 may comprise an internal system 206, external user facing apps 208, a web application hosting server 210, external systems 212, and applications for inventory integration 216 which may be part of internal system 206 and/or formed by one or more external entity-facing applications. If desired, architecture 200 may include one or more entity data and analytics systems (not shown) to assess performance of, for example, individually-branded storefronts of entities 120, 136, 146. Internal system 206 may comprise applications for inventory integration 216, API endpoints 218, APP endpoints 220, login endpoints 222, inventory services 224, and inventory allocation data stores or data storage systems 226.

II.A. Internal System

In operation, devices 202 may access internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The outer boundary of the internal system 206 depicted in dashed lines, encompassing subcomponents 216-230 (with applications 216 being depicted in lighter dashed lines to indicate that components may be included in internal and/or external systems), may represent a virtual private cloud allocated for hosting the entirety of the internal system 206. Additionally, the inner boundaries within internal system 206, also depicted in dashed lines, may indicate multiple virtual private clouds (e.g., subsets of the larger virtual private cloud encompassing the internal system 206), each allocated for one or more particular tasks, users, or purposes (e.g., inventory integration services 224, inventory management jobs 228, and data warehouse systems 230).

Devices 202 may communicate with internal system 206 through one or more applications for inventory management 216 comprising one or more web-based portals or user interfaces for operations, including operations for accessing systems for designating one or more articles for availability via one or more storefronts associated with one or more hosting entities 136 (e.g., one or more articles made available for selection on a storefront that offers the same or similar articles for purchase and/or for rental via a subscription). Each portal may generate or present a graphical user interface on a display of one or more devices 202. Applications for inventory integration 216 may include, for example, an inventory content management system and/or an inventory assignment portal. Entities 120, 136, 146 may use devices 202 to access internal system 206 to perform inventory management, inventory pooling (e.g., identifying one or more articles for availability for a transaction rental service via the storefront of another entity and/or another service such as a subscription service), article valuation, and/or other tasks.

In addition to applications for inventory management 216, internal system 206 may include internal applications, such as one or more web-based user interfaces. These interfaces may include one or more mobile applications compatible with predetermined mobile device operating systems, a software application developed for desktop operating systems, and/or a web site configured for browser access to web pages via one or more networks (e.g., the Internet or an intranet). Employees 114 may use devices employee devices (e.g., user devices 204) to access internal system 206 to perform additional tasks, such as CaaS functions related to warehouse operations and/or administrative tasks.

Internal system 206 may also include Application Programming Interface ("API") endpoints 218, APP (application) endpoints 220, and login endpoints 222. In some implementations, these endpoints may be hosted in a virtual private cloud or a physical private network. API endpoints 218 may be locations from which the APIs can access resources of the internal system 206 that the APIs need to carry out their functions. For example, the API endpoints 218 may specify where resources can be accessed by the APIs, while communicating with the APIs requesting information from the internal system 206. APP endpoints 220 may be the locations from which applications (e.g., applications for inventory integration 216, one or more internal applications) may access resources of the internal system 206 they need to carry out their functions, and the login endpoints 222 may be the touchpoints of any communication pertaining to logins (e.g., authentication and access control) associated with internal system 206. Login endpoints 222 may receive and process login communications for applications for inventory integration 216 and/or external user facing applications 208. At least some endpoints among the API endpoints 218, APP endpoints 220, and login endpoints 222, may be entity-branded endpoints, designated to serve particular entities 120, 136, 146.

In some aspects, different interfaces or functionalities may be associated with a role of each entity 120, 136, 146 (e.g., fulfiller entities 120, hosting entities 136, or others, such as an additional entities 146), the role being determined based on login information received via one or more of the API endpoints 218, APP endpoints 220, and login endpoints 222. Additionally or alternatively, separate API endpoints 218, APP endpoints 220, and/or login endpoints 222 may be provided for one or more particular roles.

Internal system 206 may include inventory integration services 224 that facilitate transaction rental systems or other pooled inventory functions, as well as inventory integration data storage systems 226 for storing information useful for operating, updating, and analyzing one or more aspects of the article integration service. Inventory integration services 224 may include services, such as microservices, for fulfillment of various CaaS operations hosted in one or more virtual private clouds or one or more physical private networks, including microservices that facilitate inventory integration for integrating articles in one or more electronic storefronts for transaction rental services. Inventory services 224, which may include inventory availability and valuation services, may facilitate changes in articles offered for transaction rental services, changes in inventories based on articles selected for a storefront associated with one or more hosting entities 136, and/or changes to valuation assigned to articles allocated to an inventory, such as an inventory of articles available for transaction rental services. In particular, one or more of these microservices may be configured to support external storefront integration, inventory reservations, value assessment and assignment, article status monitoring, and user targeting, as described in more detail below with respect to microservices 356 (FIG. 3). Additional microservices of internal system 206 may include, for example, account data, data services, customer service functions, marketing functions, warehouse functions, and/or other supporting functions.

Inventory integration data stores or storage systems 226 may be one or more databases that store both raw and processed data resulting from operations of inventory integration services 224, endpoints 218-222, external systems 212, and/or data and analytics systems 214. Inventory integration data storage systems 226 may store, for example, inventory data indicative of articles that were or are currently offered for transaction rental integration (e.g., articles selected by an entity for presentation via storefront(s) of one or more other entities), currently and previously rented articles (e.g., articles rented via transaction rental services), current and historical article valuations, performance of one or more pooled articles (e.g., a frequency or number of times one or more pooled articles is selected by a user via transaction rental services), among others. The data stored in data storage systems 226 may include transactional data, batch jobs data, searchable data including various analytics and attributes, event messages, and local logs of various raw data.

Internal system 206 may additionally include inventory management jobs 228. Inventory management jobs 228 may be hosted in, for example, one or more virtual private clouds. Inventory management jobs 228 may include, for example, system components that run and update data associated with internal system 206 that are useful for pooled inventory and article sharing. In particular, system components of inventory management jobs 228 may be configured to receive and dynamically update data associated with articles that are offered for inventory sharing, currently shared articles, and/or articles that were previously shared and presented in storefront catalogs associated with (e.g., branded) one or more entities 120, 136, 146. These system components may include, for example, components for identifying and storing historical data for each entity and each individual article or group of articles associated with one or more identifiers, snapshot data indicative of a current or recent (e.g., within 24 hours, within one week, etc.) status information of a plurality of articles, including articles included in one or more pooled inventories, articles that are currently available from a plurality of entities 120, 136, 146 for selection (e.g., closeting, selection for transaction rental, selection for expedited delivery via a subscription service, etc.) by one or more users 108, and/or valuation data associated with the historical and/or snapshot data. Jobs 228 may also include system components useful for generating recommendations presented by fulfiller/hosting entity devices 202. As an example, these recommendations may be presented, via one or more fulfiller entity devices 118, to recommend one or more articles to a fulfiller entity 120 that are available for transaction rental integration, but not yet integrated (e.g., not currently made available in a storefront associated with a hosting entity 136).

Figure 3:
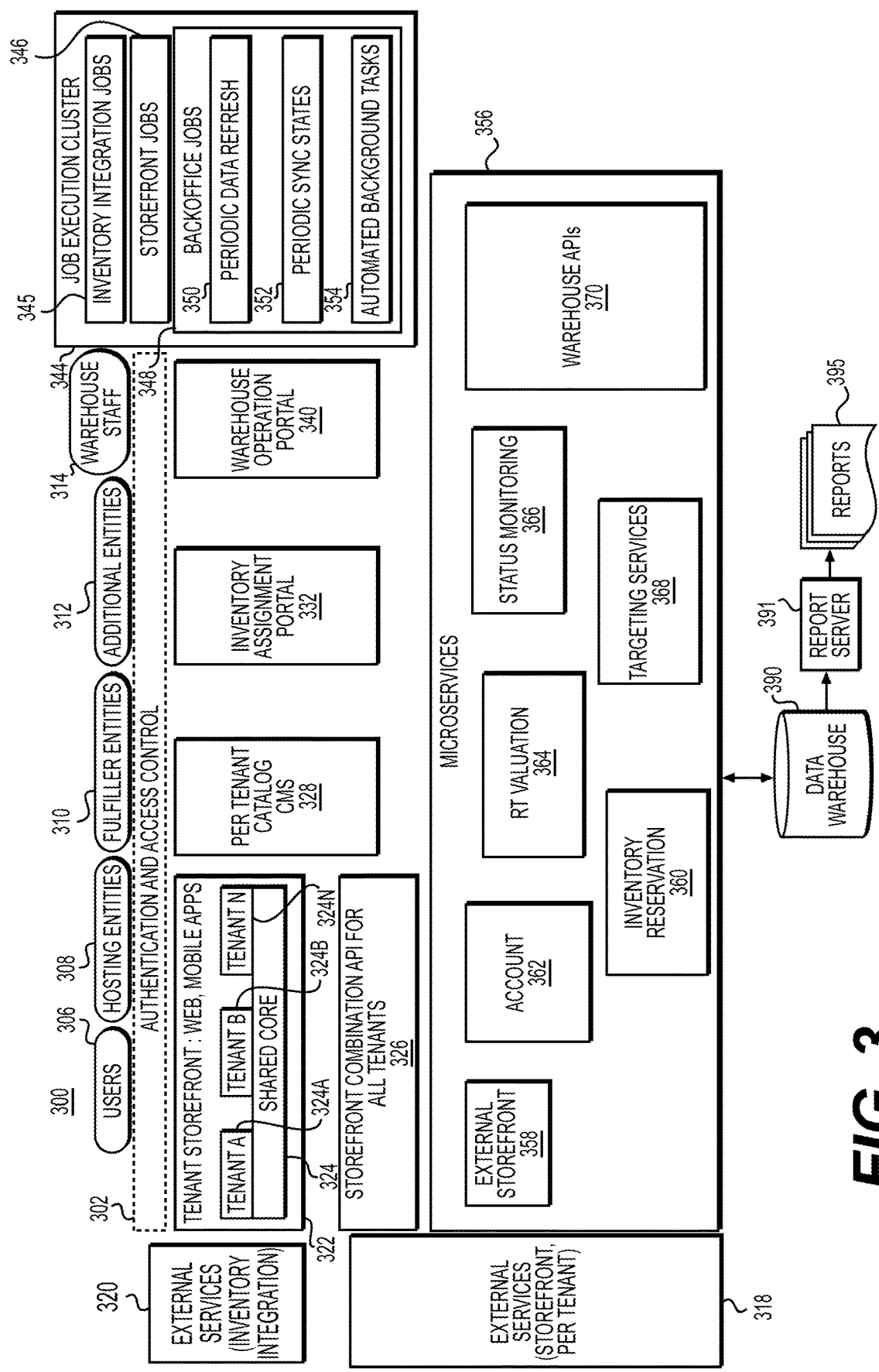
FIG. 3 is a schematic diagram depicting the architecture of an exemplary server system for an electronic platform with dynamically-updateable shared inventories, according to one or more embodiments.

Jobs 228 may also include, for example, periodic data refresh operations, periodic synchronization states among internal and external services, and automated tasks to run in the background at internal system 206, as described in more detail below with respect to job execution cluster 346 (FIG. 3). Additional jobs for internal system 206 for supporting other aspects of CaaS may include, for example, ETL (extract, transform, and load) processes that comprise collecting data from multiple different sources, converting the collected data to other one or more preset formats as necessary, and loading the data into the target database (e.g., data warehouse systems 230). Additional system components useful for jobs of environment 200 may include, for example, replenishment identifier (RID) generation service(s), size advisor data set, size advisor algorithmic preparation component(s), recommendation service(s) for generating recommendations to end users, search data sets, etc.

Internal system 206 may include file stores or databases that store snapshots, which may include the above-described snapshot data. Snapshots may include information that represents a status, at a particular moment or over a period of time, of information created, collected, and/or stored by architecture 200 and in particular, by data storage systems 226. For example, snapshots associated with inventory integration systems may be stored in inventory data storage systems 226, which may be included in one or more virtual private clouds or one or more physical private networks. Snapshots stored in systems 226 may include data representative of a current status of pooled articles, including articles that are allocated for the article integration service. Other snapshots may capture states of other aspects of internal system 206 and may be stored in systems 226 or in one or more additional data stores. Additional snapshots may capture settings, files, configurations, and the memory state of the components of the internal system 206.

These snapshots may be restored upon request or scheduling, and when a snapshot is restored, settings, and/or the state of the internal system 206 may be returned to the states they were in at the time the snapshots were captured. Internal system 206 may include third party data ETL processes which may collect data from different external sources (e.g., external systems 212), convert the collected data to other one or more preset formats, and load the data into one or more target databases.

Internal system 206 may include the data warehouse systems 230 in one or more virtual private clouds or one or more physical private networks. As discussed above, data warehouse systems 230 may include one or more target databases for ETL processes that collect data from various sources (e.g., external systems 212 or inventory exchange data storage systems 226). Data warehouse systems 230 may then utilize the collected data as, for example, parameters for business intelligence that reveals patterns, analytics, and insights for implementing an article integration service. In particular, data warehouse systems 230 may store information useful for performing analytics for the article integration service, such as identities and roles of entities engaged in the service, articles currently offered in the integration service, articles that are currently shared ("pooled") among two or more inventory services, etc. Analytics may be performed, based on information of data warehouse systems 230, by components of internal system 206 (e.g., inventory management jobs 228) and/or with one or more external systems 212.

Analysis of information stored in data warehouse systems 230 may be used for one or more reporting tools useful for monitoring the performance of one or more entities (fulfiller entities, hosting entities) and/or one or more articles involved in the article integration service. For example, such analyses may be useful for the generation and presentation of information representative of performance analytics of one or more articles offered for selection via the article integration service, performance analytics of one or more storefronts presenting articles offered for selection via the article integration service, performance analytics of a particular entity (e.g., performance of a fulfiller entity's inventory listed in a hosting entity's storefront), the performance of one or more particular roles (e.g., a group of fulfiller, hosting, or other entities), etc.

With continued reference to FIG. 2, environment 200 may also include user devices 204, which may correspond to user devices 112 (FIG. 1). Users 108 of the CaaS electronic platform may use the user devices 204 to access the internal system 206, as recipients of the services provided by the components of the internal system 206 (e.g., as potential users of transaction rental systems and/or as subscribing users that receive articles offered as a service). For example, users 108 of user devices 204 may be one or more registered subscribers who physically receive and wear items that are distributed via the CaaS electronic platform (e.g., subscribers of a service offered in connection with a fulfiller entity 120). As shown in FIG. 2, user devices 204 may access the internal system 206 via external user facing applications 208. External user facing applications 208 may be browser-accessed web pages or web-based applications that include web-based user interfaces accessible from one or more user devices 204 over one or more networks (e.g., one or more networks 101).

In some implementations, web application hosting server 210 acts as an intermediary for enabling communications made between devices 202 and internal system 206, between employee devices and internal system 206, and between user devices 204 and internal system 206. Internal system 206 may present different communications interfaces (e.g., applications) based on an identity supplied by devices 202 and 204, such as a tenant or other entity, employee, or user. In particular, internal system 206 may further provide different communications interfaces based on a particular role supplied by entity devices 202 (e.g., a role corresponding to fulfiller entities 120, hosting entities 136, or additional or hybrid entities 146).

Web application hosting server 210 may be an external (e.g., third party) server or internal (e.g., intranet, local network) server or host that provides an online platform for the article integration service. Web application hosting server 210 may host a platform for an article integration service that may be accessed by devices 202. This integration service may provide a management interface (e.g., via inventory assignment portal 332, described below) for viewing, selecting, and modifying articles or groups of articles that are available for use in the integration service. These interfaces, supporting systems and processes (e.g., components of environment 200 and/or server system 300), which are collectively or individually referred to herein as a "inventory availability and valuation service," may facilitate the ability of entities (e.g., a fulfiller entity 120), to provide one or more articles that are available for transaction rental in a storefront of another entity (e.g., a hosting entity 136).

When web application hosting server 210 communicates with user devices 204 of one or more users 108 (e.g., subscribing and/or non-subscribing users of a CaaS provider), web application hosting server 210 may present a web-based storefront interface integrating online retail components (e.g., an online point-of-sale system) onto the storefront interface. Web application hosting server 210 may communicate with the internal system 206 (e.g., the API endpoints 218, the APP endpoints 220, a device 202 or 204 logged into the internal system 206), to retrieve necessary information about the internal system 206, and to generate or dynamically update an interface for user devices 204 to interact with the storefront, the storefront allowing user devices 204 to select one or more articles as part of a subscription service, for a one-time purchase, and/or for a transaction rental interaction.

Each of the interfaces accessed by devices 202 via applications for inventory sharing 216 may be dynamically-updated by web application hosting server 210. Applications 216 may allow entity devices 204 to communicate with internal system 206 and with one or more external systems 212 to facilitate the operation and update of the management and retailer storefront interfaces that are generated, at least in part, based on information provided by the article integration service. Information, including information for the inventory availability and valuation service for inclusion in one or more retailer storefronts, may be supplied via API access communication links 250 that enable communication with external systems 212.

II.B. Supporting System(s)

External systems 212 may be configured to perform data analytics or other tasks that support operations performed with inventory availability and valuation services 224 and/or inventory management jobs 228. For example, external systems 212 may include one or more analytics system 236, payment systems 238, external storefront hosting systems 240, and value setting systems 242.

Analytics systems 236 may include computing resources in communication with one or more components of internal system 206 to collect, store, and/or manage data and analytics associated with the one or more entities 120, 136, 146. Analytics systems 236 may be located remotely from the internal system 206 (e.g., at tenant servers, servers of other entities, external cloud servers, etc.). Analytics systems 214 may communicate with the components of internal system 206 using API access or file transfer link 250 over one or more networks 101. For example, analytics systems 214 may communicate with the API endpoints 218 of internal system 206, or receive files from third party data ETL processes. Data provided for analysis by analytics systems 236 may include data stored in inventory integration data storage systems 226 and/or data warehouse systems 230. Analytics systems 214 may be accessed by employee devices 202, which may correspond to employee devices 116 or entity devices 118, 132, 142 (FIG. 1). Analytics systems 236 may be accessed by devices 202 to retrieve analytics data for business intelligence (e.g., by identifying articles that perform well, as indicated by transaction rental selections, closeting selections, try then buy selections, and/or purchase selections).

Payment systems 238 may facilitate payments from users to entities and, if desired, between entities, as part of the article integration service. Payment systems 238 may, for example, facilitate payments for an article selected for transaction rental by a user interacting with a storefront of a hosting entity 136, in a manner that facilitates involvement of a fulfiller entity 120 and/or an additional entity 146, as described below. Payment systems 238 may provide a payment tool in the form of a cloud-based platform configured to accept payments from entities with a website or within the platform's mobile application. Payment systems 238 may generate invoices and/or reports based on a relationship between a plurality of entities. For example, for a pair of entities including a fulfiller entity 120 and a hosting entity 136, payment systems 238 may be configured to review articles selected by a user for a transaction rental interaction and generate reports and/or invoices by calculating an apportionment of funds that are distributed between these entities according to the result of a transaction rental lifecycle (e.g., initial fees, daily rental fees, purchase fees, etc.) for a particular article as will be described in further detail below with reference to FIG. 6. Payment systems 238 may be accessed by devices 202 to retrieve payments and view payment analytics data.

External storefront hosting systems 240 of external systems 212 may include one or more entity-housed systems and/or cloud systems that host websites, applications, etc., for presenting one or more storefronts for hosting entities 136, as described below with respect to FIG. 5. External storefront hosting systems 240 may facilitate hosting of websites and/or applications that present a user interface that allows one or more users interacting with user devices 204 to select one or more articles for purchase. External storefront hosting systems 240 may be in communication with one or more internal systems 206 via API access 250 to share data associated with the articles offered via the electronic storefront, and to allow inventory services 224 and inventory management jobs 228 to manage inventory availability to determine whether one or more articles (e.g., articles of a pooled inventory) are available for transaction rental integration with the external storefront. While external storefront hosting systems 240 may be included in external systems 212 (e.g., at tenant servers or other entity servers), in some configurations of environment 200, external storefront hosting systems 240 may instead be implemented, either partially or entirely, within internal system 206 (e.g., hosted within internal system 206 and accessed via external user facing applications 208).

Value setting systems 242 may include one or more interfaces and/or analytics services that determine (set) a value associated with an article offered in, for example, storefront of a hosting entity 136 provided via external storefront hosting system 240. Value setting systems 242 may be in communication with internal system 206 (e.g., inventory services 224, inventory management jobs 228) via API access 250 to communicate one or more of an e-commerce price (e.g., a suggested or original price, a current or real-time price) and an article identifier (e.g., a unique identifier, a SKU, or other information indicative of article characteristics such as color, size, style, manufacturer, etc.). In the context of the current disclosure, e-commerce price is also referred to as a "listed amount." In some embodiments, value setting systems 242 may be configured to determine various fees based on the listed amount. Such fees may be associated with a transaction rental life cycle, as will be described in further detail below with reference to FIG. 6. For example, value setting systems 242 may determine a borrow amount for borrowing a wearable article during a borrow period of the transaction rental life cycle. Other fees (e.g., purchase amount, daily amount, accrued amount, purchase amount, discounted purchase amount, and maximum amount) associated with the transaction rental life cycle will be described in further detail below with reference to FIG. 6. It is understood that such fees are determined by the value setting systems 242.

Environment 200 may include data and analytics systems 214 configured to analyze and present information relevant to an article integration service, or other aspects of environment 200. Data and analytics systems 214 may include computing resources in communication with one or more components of internal system 206 that collect, store, and/or manage data and analytics associated with the one or more entities 120, 136, 146. One or more systems or components of data and analytics systems 214 may be located remotely from the internal system 206. Data and analytics systems 214 may communicate with one or more components of internal system 206 using API access or file transfer link 254 over one or more networks 101 (FIG. 1). For example, data and analytics systems 214 may communicate with API endpoints 218 of internal system 206, or receive files from third-party data ETL processes. Data and analytics systems 214 may be accessed by devices 202, and, which may correspond to entity devices 118, 132, 142 (FIG. 1), and, if desired, to employee devices 116.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally or alternatively, a set of devices (e.g., one or more devices) of environment 200 may perform one or more functions described as being performed by another set of devices of environment 200.

III. Server System

FIG. 3 is a diagram showing the architecture of an exemplary server system 300 for facilitating an inventory availability and valuation service, e.g., for providing one or more articles for selection via transaction rental integration. Server system 300 may correspond to server system 102 depicted in FIG. 1, and to internal system 206 depicted in FIG. 2.

Server system 300 may be accessed by a plurality of entities having different roles, such as users 306 (e.g., non-subscribing users and/or subscribing users of the CaaS electronic platform), hosting entities 308, fulfiller entities 310, additional entities 312, and employees of the CaaS electronic platform, such as warehouse staff 314. Each of these entities may access server system 300 via authentication and access control 302.

Users 306 may correspond to users 108 (FIG. 1). Users 306 may use computing devices (e.g., user devices 204) to access the server system 300, as recipients of the CaaS electronic platform services provided by the components of the server system 300. For example, users 306 may be one or more non-subscribing users (registered or un-registered) and/or registered subscribing users who closet or otherwise select one or more articles by reviewing storefront catalogs of one or more entities, and physically receive and wear the apparel that are distributed via the CaaS operations. Users 306 may log in to, or otherwise interact with, server system 300 to initiate tasks associated with one or more CaaS operations, such as, for example, account management, storefront catalog viewing, selecting one or more articles for transaction rental, closeting items, providing return notifications, etc.

Fulfiller entities 310 may correspond to fulfiller entities 120 while hosting entities 308 may correspond to hosting entities 136. Additional entities 312 may have characteristics of both a fulfiller entity 310 and a hosting entity 308. Thus, additional entities 312 may correspond to additional entities 146, as well as to one or more fulfiller entities 120 and/or hosting entities 136.

Fulfiller entities 310 may include entities whose physical inventory of articles is at least partially made available and offered via the article integration service. This physical inventory may include one or more "pooled" inventories, or inventories that are provided for multiple service types. For example, a pooled inventory supplied by a particular fulfiller entity 310 (or, if desired a CaaS operator or CaaS tenant) may include one or more articles available for transaction rental. One or more of the articles available for transaction rental may also be included as part of a subscription service of a CaaS, and, in particular, a "real-time" inventory associated with the CaaS. Such an inventory may be available for selection by one or more CaaS users (e.g., to guarantee that an upcoming shipment provided as part of the subscription service includes an expedited article). Thus, a "pooled" article may be made available to one or more users 306 as an article available for expedited handling as part of a subscription service, and also available for selection via a storefront of one or more hosting entities 308 for a transaction rental service that integrates articles from a fulfiller entity 310, additional entity 312, etc., with a storefront of one or more hosting entities 308. While fulfiller entities 310 may offer articles to subscribing users 306, if desired, one or more fulfiller entities 310 may provide articles via another entity (e.g., hosting entities 308 and/or additional entities 312) without directly offering any articles to users 306.

Hosting entities 312 may include entities that provide a storefront having one or more articles listed for purchase and/or for subscribing users. Hosting entities 312 may for example, provide articles for purchase and may not have an existing system for transaction rental services. Thus, hosting entities 312 may employ the physical inventory or inventories offered by fulfiller entities 310 and additional entities 312 to provide one or more articles for transaction rental services, as described below.

Additional entities 312 may act as both hosting entities 308 and fulfiller entities 310, depending on the role of the entity 312 in a particular interaction. Thus, additional entities 312 may offer one or more articles via an electronic storefront for purchase and/or as part of a subscription service, and may offer one or more articles for transaction rental on the storefront of another additional entity 312 or a hosting entity 308 via an inventory availability and valuation service.

Warehouse staff 314 may correspond to employees 114 and other users of devices 116, and may access a warehouse operation portal 340 or other portals to support CaaS operations, as described below. Warehouse staff 314 or other employees 114 may log in to server system 300 and, via warehouse portal 340 or other portals may initiate, view, manage, enter data in, or perform administrative tasks related to warehouse and other operations.

In order to control access to server system 300, entities 306-314 may communicate with authentication and access control component 302, which may grant access to the server system 300 only if the access-requesting entity is successfully authenticated based on the access control conditions corresponding to the particular entity. Access control conditions may be stored in a memory in communication with server system 300, and may be applied to a particular entity based on various entity-specific factors, such as, for example, the authorized role(s) of each entity, the device being used by each entity, the portal sought to be accessed, and/or the geographic location of each entity.

External services 318 may be services associated with tenant-specific storefronts (e.g., storefronts 322 associated with a tenant for offering articles as a service). Services 318 may provide, for example, customer support services, marketing and advertisement services, content management systems for building and updating each tenant-specific storefront, and analytics services for tracking and reporting the performance of the tenant-specific storefronts.

External services 320 may include services that are configured for use with inventory integration (e.g., inventory integrated by use of inventory availability and valuation service 224) with one or more of entities 308, 310, 312. These external services 320 may include, for example, valuation services for hosting a storefront associated with article purchases (e.g., external storefront hosting systems 240), managing valuations of articles listed via the article integration service (e.g., value setting systems 242) and analytics services (e.g., analytics services 236) for analyzing and reporting performance of storefronts and/or articles listed via the article integration service (e.g., analytics representative of the frequency with which articles are selected for transaction rental by users 306, average valuations of these articles, etc.).

Tenant storefront 322 may include storefronts be accessed by users 306 for purchasing or closeting articles included in one or more storefront catalogs, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, and/or microservices 356) using storefront combination API 326. Each tenant storefront 322 may present a plurality of articles for purchasing, closeting and/or selection of articles by users 306. These articles may include one or more articles that are provided by an article integration service.

Tenants 308, 310, 312 may access per tenant catalog content management system (CMS) 328. The per tenant catalog CMS 328 may comprise a portal that includes one or more user interfaces for communicating with entities 308, 310, 312 to create, modify, and/or update one or more article catalogs for the tenant storefront 322 (e.g., catalogs of the storefront interface 324A for tenant A). Per tenant catalog CMS 328 may be in communication with external services 318. External services 318 may include online storefront management services, including subcomponents, such as a storefront user interface building/updating tool and a dashboard for managing sales operations as orders, payments, and/or shipping. Data maintained by one or more of the external services 318 may also be communicated to the per tenant catalog CMS 328. Communication between the per tenant catalog CMS 328 and the external services 318 may be performed by, for example, storefront combination API 326, and/or data exchange over the one or more networks 101.

Tenant storefront 322 may be accessed by users 306 for selecting articles, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, and/or microservices 356) using storefront combination API 326. Each tenant storefront 322 may present a plurality of articles available for closeting. In some aspects, tenant storefront 322 may correspond to storefronts for purchasing articles and/or for selecting articles, by users 306.

Entities 308, 310, 312 may access per tenant catalog content management system (CMS) 328. The per tenant catalog CMS 328 may comprise a portal that includes one or more user interfaces for communicating with entities 308, 310, 312 to create, modify, and/or update one or more apparel catalogs for the tenant storefront 322 (e.g., storefront catalogs in the storefront interface 324A for tenant A as part of an article subscription service). Per tenant catalog CMS 328 may be in communication with the external services 318. External services 318 may include online storefront management services, including subcomponents such as a storefront user interface building/updating tool and a dashboard for managing sales operations as orders, payments, and/or shipping. Data maintained by one or more of the external services 318 may also be communicated to the per tenant catalog CMS 328. Communication between per tenant catalog CMS 328 and external services 318 may be performed by, for example, storefront combination API 326, and/or data exchange over the one or more networks 101.

Entities 308, 310, 312 may each access inventory assignment portal 332. Inventory assignment portal 332 may allow fulfiller entities 310 and additional entities 312 to designate one or more articles that are available via the inventory availability and valuation service. Inventory assignment portal 332, or one or more separate portals, may also allow hosting entities 308 to browse articles designated by entities 310, 312, and to select one or more these articles for transaction rental integration via an electronic storefront associated with the hosting entity 308.

At the server system 300, warehouse staff 314 may access a warehouse operation portal 340. Warehouse staff 314 authorized for such access may be one or more employees associated with warehouse operations of the CaaS electronic platform of the server system 300. Warehouse portal 340 may include one or more user interfaces at which warehouse staff 314 may, for example, initiate, view, manage, enter data in, or perform administrative tasks related to warehouse operations. The warehouse portal 340 may communicate with microservices 356, including, for example, warehouse APIs 370. Warehouse APIs 370 may include service components that may communicate with the warehouse operation portal 340 may include, for example, order processing, item photoshoot, inventory, inventory location, garment allocation, order fulfillment, shipping label management, package and shipment operations, return processing, laundry, and cycle count.

Warehouse APIs 370 may facilitate the management of physical inventories that are located in one or more distribution centers, such that a particular warehouse may include articles that are shared between a plurality of entities among entities 308, 310, 312. Warehouse APIs 370 may facilitate the management of article allocation via one or more databases, for example. Data for a particular shared article that is managed via warehouse APIs 370 may identify each entity that is sharing the article, the entity that supplied the article, and other data stored in data warehouse 390 (and in inventory allocation database 480, 620, described below).

Portals 332 and 340 may communicate with one or more components of microservices 356, and/or external services 318, 320, via one or more suitable APIs and/or over the one or more networks 101. Suitable APIs may include, for example, APIs access communication links 250 and/or 254 (FIG. 2). In at least some configurations, portals 332 and/or 340 may correspond to applications for inventory sharing 216, external systems 212, or both (FIG. 2).

Within server system 300, a group of hosts (e.g., computing resources) may form a job execution cluster 344. Job execution cluster 344 may utilize the combined computing power and shared resources of the hosts to process one or more jobs (e.g., workloads) of server system 300. Job execution cluster 344 may, for example, dynamically allocate the combined computing power and the shared resources of the hosts, to perform one or more jobs associated with storefront, back office, and article integration tasks. For a plurality of different jobs, the allocation of the computing power and the resources may be prioritized based on predetermined criteria, such as, for example, criticality, cost, time/order of receipt, and/or urgency. Job execution cluster 344 may be configured to execute inventory integration jobs 345, storefront jobs 346, and back office jobs 348.

Inventory exchange jobs 345 may configure job execution cluster 344 to perform background tasks triggered by one or more actions of entities 308, 310, 312 and/or actions of users 306. Actions of entities 308, 310, 312 may trigger background tasks by an interaction with portal 332. For example, if a hosting entity 308 selects one or more articles offered for integration from a supplied inventory of a fulfiller entity 310 (e.g., for inclusion in a transaction rental service integrated with an electronic storefront of hosting entity 308), inventory integration jobs 345 may perform tasks, such as initiating one or more microservices 356 and calling one or more APIs corresponding to microservices 356. Actions of users 306 that trigger inventory integration jobs 345 may include viewing a storefront of a entity 308, 312, that is associated with an inventory availability and valuation service, and interacting with one or more graphical elements associated with a particular article or group of articles. As an example, a user 306 may view an article that is available for purchase on an externally-hosted storefront of a hosting entity 308. In response, inventory integration jobs 345 may perform background tasks to determine whether a corresponding article is available via an article integration service, a corresponding transaction rental value of the article, etc. These tasks may include calling one or more APIs corresponding to microservices 356, including APIs associated with external storefront 358, inventory reservation 360, account 362, real-time ("RT") valuation 364, status monitoring 366, and/or targeting 368. Additionally or alternatively, job execution cluster 344 may call one or more external service components of services 320.

Storefront jobs 346 may configure job execution cluster 344 to perform background tasks triggered by actions of users 306 at tenant storefront 322 (e.g., a storefront of a CaaS for subscribing users associated with one or more entities 308, 310, 312), such as initiating an order for one or more garments for shipment to a first user. In response to such an action by a user 306, job execution cluster 344 may execute a series of tasks under storefront jobs 346, including initiating one or more microservices 356, including warehouse APIs 370. Inventory exchange jobs 345 and storefront jobs 346 may be performed on demand at server system 300, whenever tenant or user actions are received via portal 332 and/or via tenant storefront(s) 322.

Back office jobs 348 may configure the job execution cluster 344 to perform tasks such as periodic data refresh 350, periodic synchronization states 352, and automated background tasks 354. In some implementations, back office jobs 348 may correspond to, or include, inventory management jobs 228 (FIG. 2). Job execution cluster 344 may execute jobs scheduled under periodic data refresh 350, in accordance with one or more predetermined data refresh schedules. During each iteration of a job under periodic data refresh 350, applicable variable data (e.g., metrics, scores, recommendation outputs, prices, etc.) stored in databases associated with data warehouse 390 may be refreshed based on the values of the input parameters captured at the time of execution. For example, periodic data refresh 350 may refresh the values and/or data associated with the article integration service, such as inventory allocation and/or assignment, article valuation, etc. Periodic data refresh 350 may also refresh values and/or data associated with subscribing user functions, such as matching and fulfillment operations, pricing, achievable service level (ASL) and item retirement, discovery and recommendation, and other data science jobs.

Job execution cluster 344 may also execute one or more jobs scheduled under periodic synchronization states 352. For example, a job under periodic synchronization states 352 may synchronize states between microservices 356 and external states (e.g., external services 318 and 320). Job execution cluster 344 may execute jobs scheduled under automated background tasks 354, such as tasks triggered from portal 332 based on actions of entities 308, 310, 312. A job under automated background tasks 354 may also be generated in response to an action of one or more employees such as warehouse staff 314 interacting with warehouse operation portal 340.

Server system 300 may include microservices 356 that are available for deployment, for example, via one or more APIs. Microservices 356 may correspond to inventory integration services 224 depicted in FIG. 2. Microservices 356 may be services hosted at the virtual private clouds, as shown in FIG. 2, and may include external storefront 358, inventory reservation 360, account 362, real-time (RT) valuation 364, status monitoring 366, targeting 368, and warehouse APIs 370. While individual microservices 358-370 are shown in FIG. 3, as understood, one or more of these microservices may be combined, or may be accomplished by one or more additional microservices.

External storefront 358 may facilitate communication between one or more externally-hosted storefronts associated with hosting entities 308 and/or additional entities 312. External storefront 358 may be configured to communicate with, for example, an electronic commerce (e-commerce) storefront hosted externally of server system 300. External storefront 358 may include service components, such as APIs, configured to receive an article identifier associated with an internal or external storefront (e.g., an article viewed by a user 306 interacting with the storefront). External storefront 358 may facilitate identification of an article associated with the article identifier, identification of an allocation of one or more physical articles available for transaction rental selection, and identification of a transaction rental valuation associated with the article.

Inventory reservation 360 may be configured to initiate API calls to identify and update a reservation status of specific article(s) that are identified by via API calls initiated by external storefront 358. Reservation status of an article may include updating and/or reading a flag indicative of whether a particular physical article is available for transaction rentals. Inventory reservation 360 may be initiated when a user interacts with a storefront and thus initiates one or more components of the inventory availability and valuation service, and may temporarily reserve an article while a user completes a transaction rental interaction.

Account 362 may include service components such as, for example, new account creation, password login, social network login, password reset, single sign-on function(s), and/or session renewal function(s). These service components may be activated by users 306 for accessing storefronts 322, entities 308, 310, 312 for accessing per tenant catalog CMS 328, inventory assignment portal 332, or by warehouse staff 314 for accessing warehouse operation portal 340. Account 362 may facilitate identification of users 306 and may support identification of a user type. For example, by authenticating a user 306, account 362 may facilitate identification of a user status or classification, such as a non-subscribing user, a subscribing user, a new user, etc.

RT valuation 364 services may include service components for assigning one or more of borrow amount, purchase amount, daily amount, accrued amount, purchase amount, discounted purchase amount, maximum amount, or other values associated with an article provided for transaction rental via the inventory availability and valuation service. These service components may initiate communication with value setting systems 242 or, when value setting systems 242 are included in internal system 206, may include components for calculating appropriate values for one or more articles offered via the inventory availability and valuation service.

Status monitoring 366 may include one or more service components for determining status of one or more articles offered via the inventory availability and valuation service. In particular, one or more microservices for status monitoring 366 may include service components for monitoring status of articles that were selected via an inventory availability and valuation service by users 306. Status monitoring service 366 may enable operations including, for example, monitoring a lifecycle status of an article that is in the possession of a user 306 (e.g., data indicative of whether a particular physical article is in an initial transaction rental period, a daily transaction rental period, etc.). Status monitoring service 366 may support operations for enabling users 306 to view current and previously-rented articles, costs associated with these rentals, and current status of rented articles that were supplied by the inventory availability and valuation service and/or by an article subscription service. In some embodiments, status monitoring 366 may monitor a borrowed wearable article during a transaction rental lifecycle.

Targeting services 368 may include one or more service components that retrieve (e.g., from account service 362) a user identifier or other characteristic associated with a user 306 interacting with an internal or external storefront. Targeting services 368 may be configured to transmit an instruction for generating a transaction rental call-to-action (CTA) based on an article identified via external storefront services 358 and/or the user 306 identified via external storefront services 358. For example, targeting services 368 may include service components for performing prioritization for determining which users of users 306 are presented with a transaction rental CTA based on the identity and/or characteristic of these users 306, an identity of a storefront that a particular user 306 is interacting with, or other targeting criteria, as described below.

Warehouse APIs 370 may include service components such as, for example, order processing, photoshoot (e.g., capturing electronic images of articles being made available for rental or purchase transactions), warehouse inventory (e.g., computer-implemented functions associated with inventory management of items to be rented or purchased), warehouse location (e.g., locating item in a warehouse), fulfillment (e.g., fulfilling initiated orders), shipping label (e.g., generating, modifying, or outputting shipping labels), package and shipment (e.g., computer-implemented functions associated with packaging, sorting, and/or delivering the shipments out to users 306), return processing (e.g., processing return items that have been received at a warehouse), laundry (e.g., computer-implemented functions associated with performing laundry of the returned items), and/or cycle count (e.g., computer-implemented functions associated with counting cycles that each wearable item have gone through).

Microservices 356 may be in communication with a plurality of databases, including, for example, databases included in data warehouse 390. Data warehouse 390 may include one or more data repositories that are dynamically updated based on tenant interactions with per tenant catalog CMS 328, portals 332, 340, etc. Data warehouse 390 may also include dynamically updated data repositories that reflect interactions of users 306 with one or more storefronts, including the interactions of users 306 to select articles made available for transaction rental via the article integration service and/or articles provided for transaction rental via a pooled inventory of articles.

At server system 300, an ETL system (not shown) may extract, transform, and load various data outputs into data warehouse 390, so that data warehouse 390 may serve as a unified source of data that are used for business intelligence or business analytics, including analytics indicative of the performance of the inventory availability and valuation service. For example, the ETL system may collect data from multiple different sources, convert the collected data to preset formats, and load the data into the data warehouse systems 390. In some implementations, the data warehouse 390 may correspond to the data warehouse systems 230 (FIG. 2).

As shown in FIG. 3, data warehouse 390 may be in communication with a report server 391. Report server 391 may be an external data visualization engine which may be configured to collect data from data warehouse 390 and generate reports focused on business intelligence and analytics. Reports may be scheduled and/or automated with preconfigured settings (e.g., applicable time periods, input parameters, output metrics, output format, etc.), to produce reports 395. Additionally, or alternatively, ad hoc requests may be received from one or more entities 308, 310, 312, such that report server 391 may respond to the ad hoc requests by generating and communicating reports 395. Reports 395 may present information indicative of a performance of aspects of the inventory availability and valuation service, including the performance of articles or groups of articles, performance of storefront(s) that present articles via the inventory availability and valuation service, or performance of one or more entities 308, 310, 312.

The number and arrangement of devices, components, and communication networks shown in FIG. 3 are provided as an example. In practice, there may be additional devices, components, and/or communication networks, fewer devices, components, and/or communication networks, different devices, components, and/or communication networks, or differently arranged devices, components, and/or communication networks than those shown in FIG. 3. Furthermore, two or more devices shown in FIG. 3 may be implemented within a single device, or a single device shown in FIG. 3 may be implemented as multiple, distributed devices. Additionally or alternatively, a set of devices (e.g., one or more devices) associated with server system 300 may perform one or more functions described as being performed by another set of devices associated with server system 300.

IV. Exemplary Article Integration Service Implementations

Figure 4A:
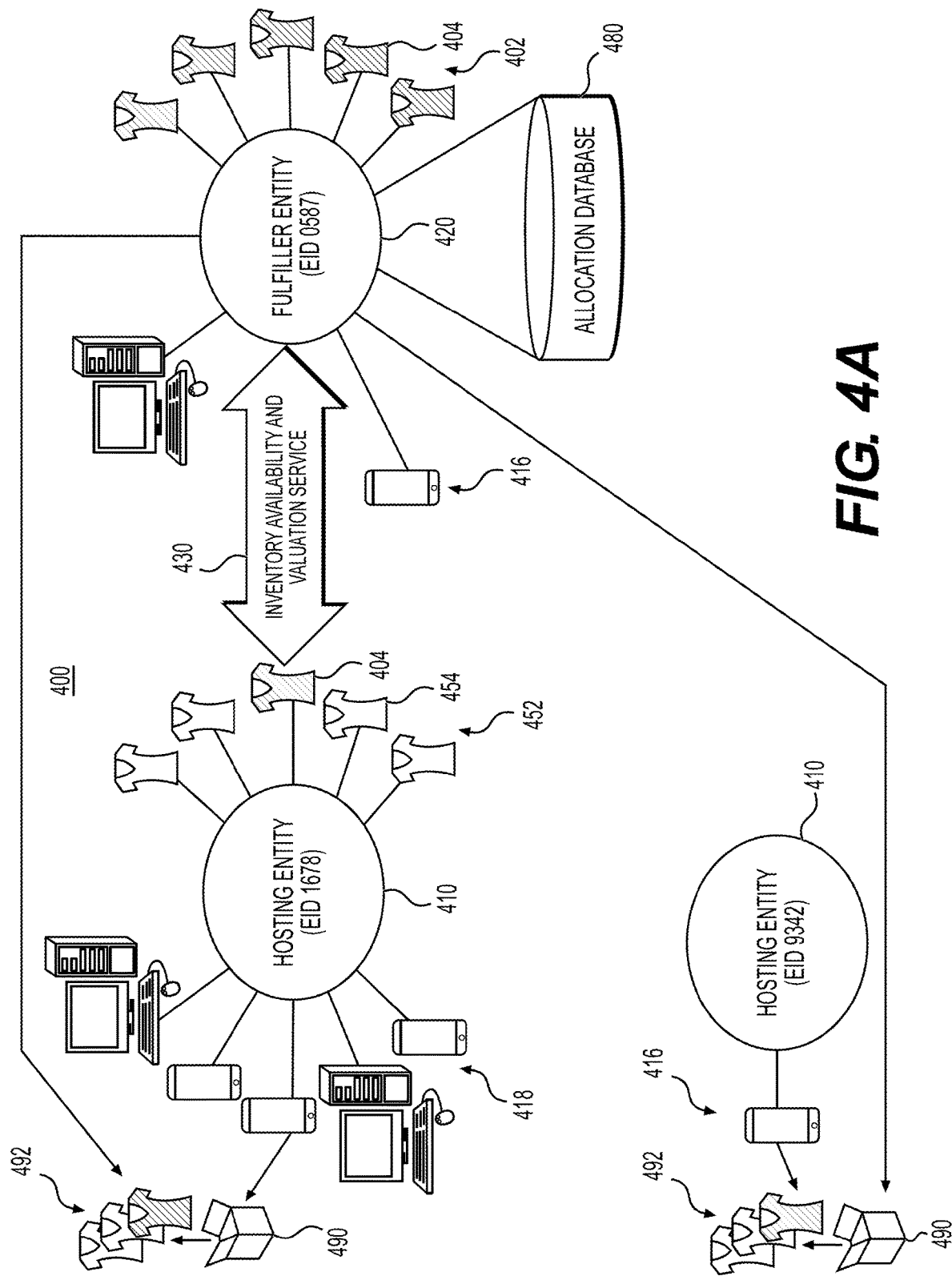
FIG. 4A is a diagram showing interactions of a plurality of entities and users associated with an exemplary transaction rental service.

FIG. 4A is a diagram illustrating an exemplary implementation of environment 100, architecture 200, and/or server system 300 for operating an article integration service 430 that, if desired, may be associated with a CaaS platform. Implementation 400 is simplified and exemplary.

Implementation 400 may enable functionality that allows entities, such as a plurality of hosting entities and a plurality of fulfiller entities, to integrate transaction rental features into independent storefronts and to provide transaction rental functionality in a manner that reduces the amount of development and testing required to deploy transaction rental functions. As shown in FIG. 4A, one or more articles 404 of an inventory 402 associated with a fulfiller entity 420 (which may correspond to entities 120, 146, 310, 312), may be integrated via inventory availability and valuation service 430 with a storefront of a hosting entity 410 (which may correspond to entities 136, 146, 308, 312).

In the exemplary implementation 400, a fulfiller entity 420 (having an exemplary entity ID 0587) may be associated with an inventory 402 that includes a plurality of articles 404 that were supplied (e.g., manufactured or purchased and transferred to a warehouse, such as a warehouse associated with a CaaS operator, for distribution to one or more users 416). Articles 404 of inventory 402 may include one or more articles that have been used in one or more previous usage cycles. For example, articles 404 may include articles that have been previously shipped to, and returned by, one or more users 416. Users 416 may correspond to users 108, 306, and may include subscribing users associated with a tenant of the CaaS and/or subscribing users of one or more fulfiller entities 420.

A hosting entity 410 (having an exemplary entity ID 1678) may be associated with an inventory 452 that includes a plurality of articles 454, each of the articles 454 being included in a physical inventory that is made available for users 418 via an electronic storefront of hosting entity 410 (e.g., an external storefront for purchasing articles 454). These articles 454 may each be excluded from a subscription service and/or from a transaction rental service or other service(s) for temporary use of articles 454. Users 418 may correspond to users 108, 306, and include one or more subscribing users associated with a CaaS. In particular, one or more users 418 may be a subscribing user associated with a subscription service of tenant and/or a fulfiller entity 420.

In some embodiments, one or more hosting entities 410 (an exemplary entity 410 having an entity ID 9342 in FIG. 4A) may offer articles solely from other entities, without the need to acquire or supply a physical inventory. For example, a hosting entity 410 may offer one or more articles from one or more fulfiller entities 420 (one such entity 410 being shown in FIG. 4A). These hosting entities 410 may act as aggregators that offer articles for sale and for transaction rentals without physically providing articles to the CaaS. As aggregators, such entities 410 may offer articles physically supplied by a plurality of different fulfiller entities 420. If desired, such hosting entities 410 may be associated with one or more storefronts that are constituted entirely by articles from other entities. These articles may include solely articles available for transaction rentals, if desired.

An allocation database 480 may include data sets for allocating articles of inventories 402, 452. Allocation database 480 may enable the operation of article integration service 430 through real-time management of article reservations, as described below. Information corresponding to each inventory 402, 452 may be created, stored, and dynamically updated in one or more inventory allocation databases 480, which may correspond to one or more databases associated with data warehouse 390, data warehouse systems 230, and/or databases 106.

Inventory availability and valuation service 430 may enable a user 418 interacting with a hosting entity 410 to select an article 404 that is supplied by fulfiller entity. Inventory availability and valuation service 430 may be configured to integrate at least a part of inventory 402 of fulfiller entity 420 with a storefront of hosting entity 410. In particular, service 430 may enable one or more articles 404 that correspond to (e.g., share a SKU, color, size, and/or style) an article of inventory 452 to be offered as part of transaction rental service enabled in a storefront of a hosting entity 410 by inventory availability and valuation service 430. Thus, one or more articles 404 supplied by fulfiller entity 420 may be included in articles 492 of a physical shipment 490 physically shipped based on a user's interaction with the storefront of hosting entity 410. In some aspects, each of articles 404 and 454 may be located in the same physical location (e.g., a single logistics center or warehouse). However, if desired, one or more of articles 404 and 454 may be present at different physical locations, such as warehouses, before these articles are supplied to a user.

Figure 4B:
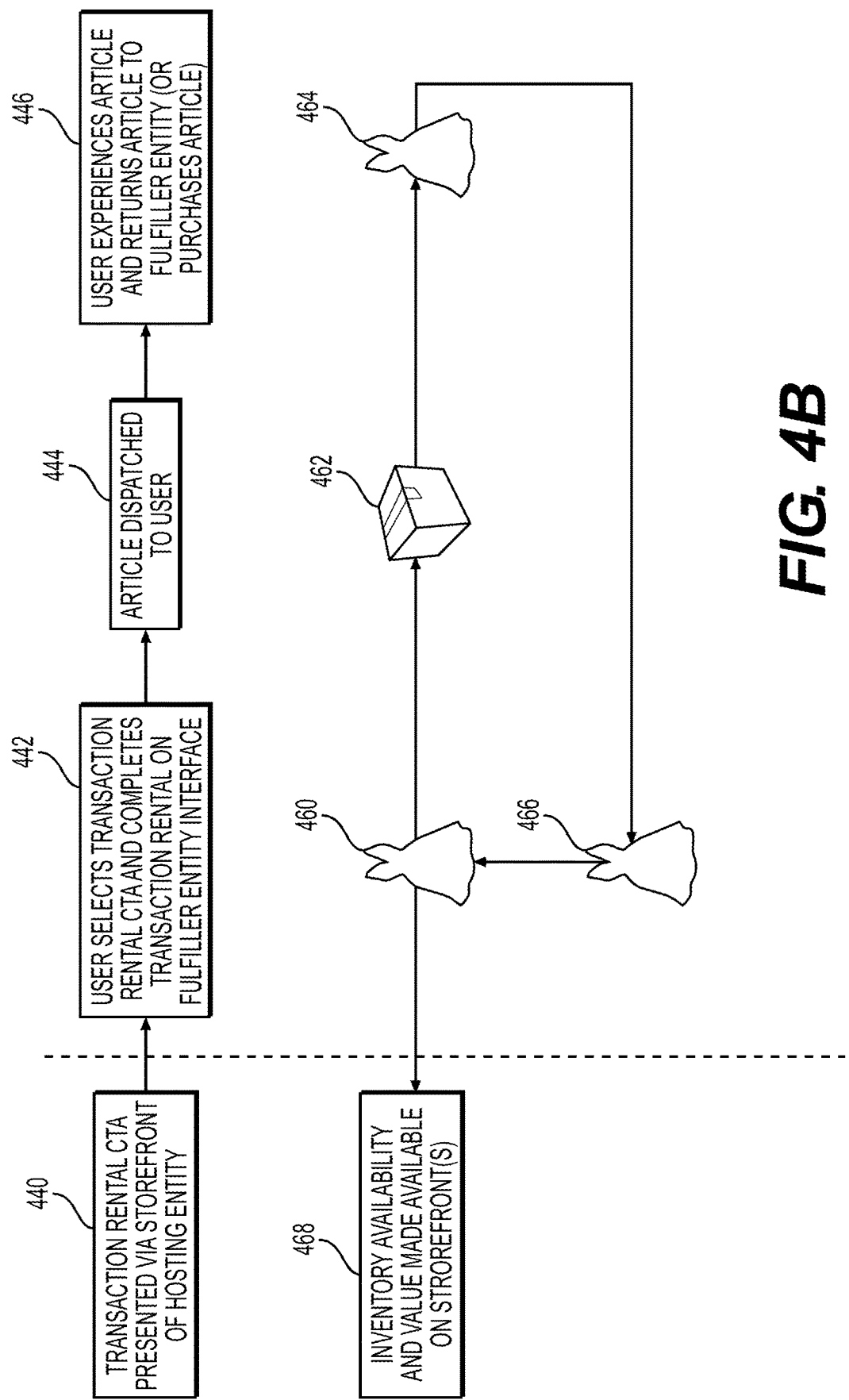
FIG. 4B is a diagram illustrating an exemplary transaction rental sequence, according to one or more embodiments.

FIG. 4B is a diagram illustrating an exemplary transaction rental sequence. As shown in FIG. 4B, as a first Step 440, a transaction rental CTA (e.g., transaction rental CTA 524 shown in FIG. 5 and described below) may be presented on a storefront of a hosting entity. This may include enabling inventory availability and valuation service 430 in a step 468. In particular, this CTA may be presented when an article viewed on the hosting entity storefront matches a corresponding article 460 associated with a fulfiller tenant, this corresponding article 460 of the fulfiller tenant being available for a transaction rental service. A user may select CTA 524 and complete a transaction rental process (e.g., by interacting with an electronic interface associated with the fulfiller entity).

A step 444 may include shipping or otherwise dispatching the article to the user. This may be performed by packing 462 the requested article by itself or with one or more additional articles. Once the requested article is delivered to the user's requested destination, the user may experience the article 464 for a period of time. If desired by the user, the article 464 may be purchased. When the article is not purchased and is returned 466, the returned article 466 may be received by the fulfiller entity (or an associated CaaS operator) and may be processed (e.g., inspected, cleaned, and transferred to a storage location). This may replenish the article, allowing an update to the availability of the replenished article 460.

V. Exemplary Article Integration Service Implementations

Figure 5:
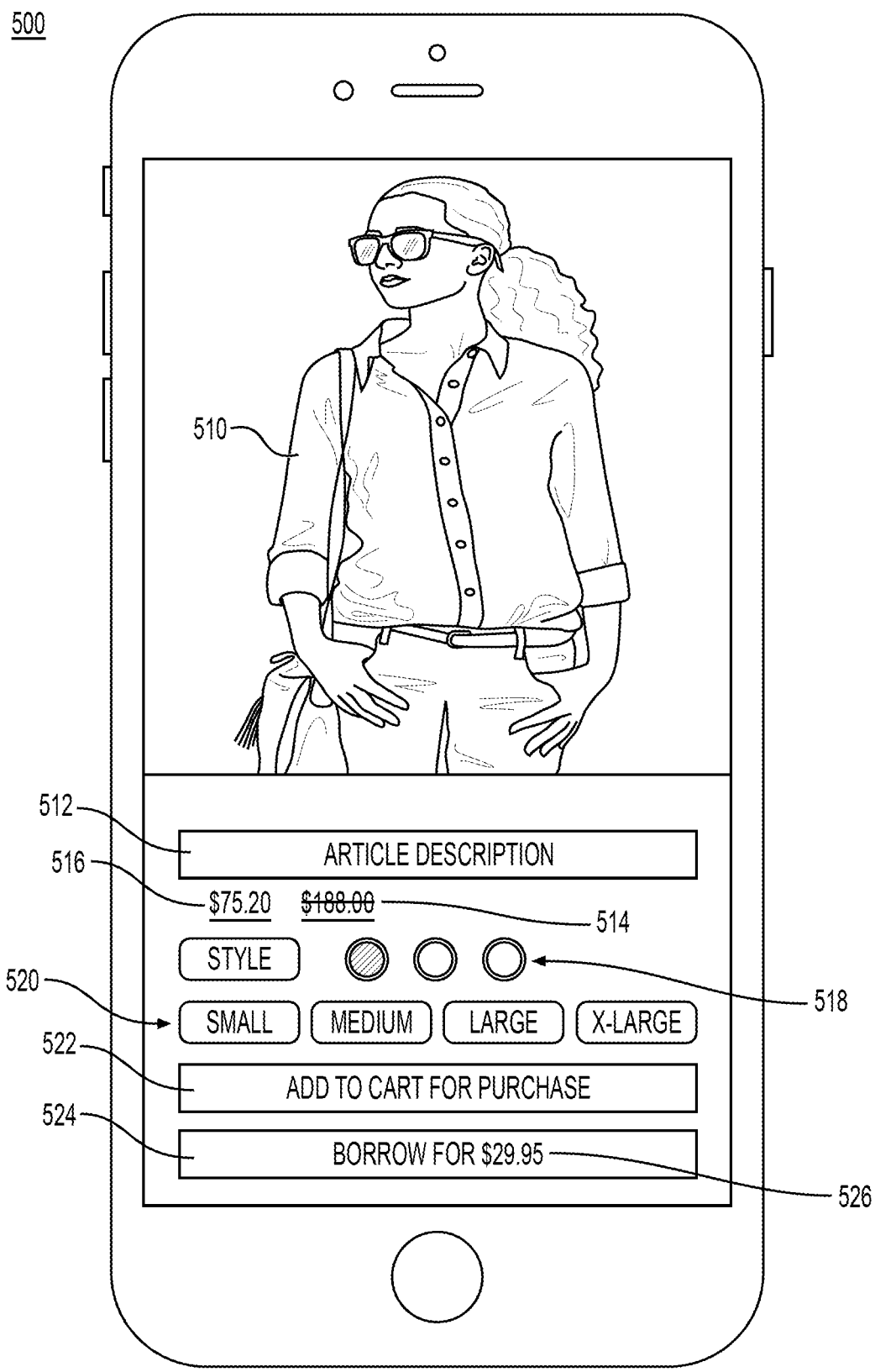
FIG. 5 is a diagram showing an exemplary user environment, according to one or more embodiments.

FIG. 5 is a diagram illustrating an exemplary storefront environment 500 implemented via environment 100, architecture 200, and/or server system 300. Environment 500 may include one or more graphical elements that are presented via user device 112. These graphical elements may, for example, allow a user to interact with an electronic storefront, such as a storefront of a hosting entity 410.

A user interacting with an electronic storefront may be presented with a plurality of articles as graphical elements, such as an article image 510. Additional article information may be presented via article description 512. The article description may include information associated with article image 510, such as style information, an article name, a manufacturer, etc. Environment 500 may also include values 514, 516 (e.g., values indicative of a purchase price of article 510), category (e.g., style) selectors 518, characteristic selectors 520, purchase call-to-action (CTA) 522, transaction rental CTA 524, and transaction rental value 526.

One or more values 514, 516, associated with article 510 may be accessed, in real time (e.g., when environment 500 is generated, e.g., in response to an a user making an initial selection of article 510 from a storefront presenting a plurality of articles). For example, RT valuation 364 microservice (FIG. 3) may be initiated to retrieve value 514 and/or value 516 via an API (e.g., API access 250) in communication with one or more systems (e.g., external services 318, external storefront hosting systems 240) that host the electronic storefront associated with environment 500. A value 514 may correspond to an initial value set by hosting entity 410, a recommended value associated with article 510, or similar value assigned to article 510 when article 510 is initially offered. A value 516 may be a current value that is set, on demand, by hosting entity 410. Value 514, value 516, or both, may be set by with value setting systems 242 such that RT valuation 364 is configured to retrieve an updated value as necessary in real-time or near-time. RT valuation 364 may retrieve one or both values 514, 516 by initiating an API call to communicate with an external system. In some configurations, RT valuation 364 may be initiated periodically (e.g., hourly, daily, weekly, etc.), instead of retrieving value 514, 516 in real-time.

A user may, by interacting with environment 500, select a desired article category by changing the selected category selectors 518 and a desired article characteristic (e.g., size) by changing the selected characteristic selector 520. Purchase call-to-action (CTA) 522 may allow a user to begin a process for purchasing article 510 according to the selected category and characteristic.

Transaction rental CTA 524 may be a dynamically-generated graphical element implemented via microservices 356, and may be generated according to actions (e.g., API calls) or other service components of external storefront 358, inventory reservation 360, account 362, RT valuation 364, and/or targeting services 368. Transaction rental CTA 524 may be generated by taking a plurality of factors into account, including an identity of the user interacting with environment 500 (e.g., as determined via account 362), an availability of an article in a pooled inventory) determined via inventory reservation 360, a valuation determined via RT valuation 364, and a desired subset of users that are eligible for transaction rental services determined via targeting services 368. An API, such as external storefront 358 may cause transaction rental CTA 524 to be included in environment 500. In response to a change initiated by an interaction with one or both of a category selector 518 and characteristic selector 520, inventory reservation 360 may be initiated to determine whether a fulfiller's inventory (e.g., inventory 402) includes an available article that matches the newly-updated category and characteristic. Thus, transaction rental CTA 524 may be updated in real-time or near real-time, and may be omitted from environment 500 when no article is available that matches the updated category and/or characteristic.

Account 362 may facilitate an identification or category of the user interacting with environment 500. This identity may be compared to a desired or targeted category of users via targeting services 368. For example, transaction rental CTA 524 may be presented with the identified user is a subscribing user associated with a CaaS. In addition to users having a desired subscription status, categories of users that may be targeted for a transaction rental CTA 524 may include, first-time users and/or new users (e.g., a user that created an account and/or joined a subscription service within a predetermined period of time such as one month, two months, three months, six months, one year, etc.). Targeted users may include, for example, users associated with a CaaS (e.g., a subscribing user) that does not have a subscription with the hosting entity and fulfilling entity associated with a particular transaction rental interaction, prior users of a transaction rental service, etc. Users may be targeted based on the value of previously-rented articles. For example, targeted users may include users that rented at least one article having a value equivalent to, or below, a particular value, users that rented at least one article having a value equivalent to, or above, a particular value, users whose cumulative activity is less than a particular activity level (e.g., a particular cumulative spend, a particular cumulative number of articles and/or transaction rental interactions), and/or users whose cumulative activity is greater than a particular activity level.

A transaction rental value 526 may be presented in environment 500 together with transaction rental CTA 524. Transaction rental value 526 may indicate a value associated with initiating a one-time rental of article 510. In some aspects, transaction rental value 526 may be generated, in real time, based on the value(s) identified with RT valuation 364. In one example, RT valuation 364 may extract one or both values corresponding to values 514, 516, and determine a numerical value 526 as a function of values 514 and/or 516. For example, value 526 may be determined by retrieving a current valuation (also referred to herein as the listed amount) of article 510 via RT valuation 364, and generating a value presented as transaction rental value 526 as a percentage of the retrieved current valuation. In addition to presenting a transaction rental CTA 524 based on these or other characteristics of the user, targeting services 368 may modify value 526 based on the same or similar criteria as discussed above for targeting transaction rental CTA 524. For example, a targeted user may be offered a discounted price to encourage users with relatively low activity to engage in the transaction rental service and/or to reward high-volume or high-value customers. In some embodiments, transaction rental value 526 may be determined based on a set of attributes including, for example, user data, geography, time of day, date, and/or season.

VI. Exemplary Transaction Rental Lifecycle

Figure 6:
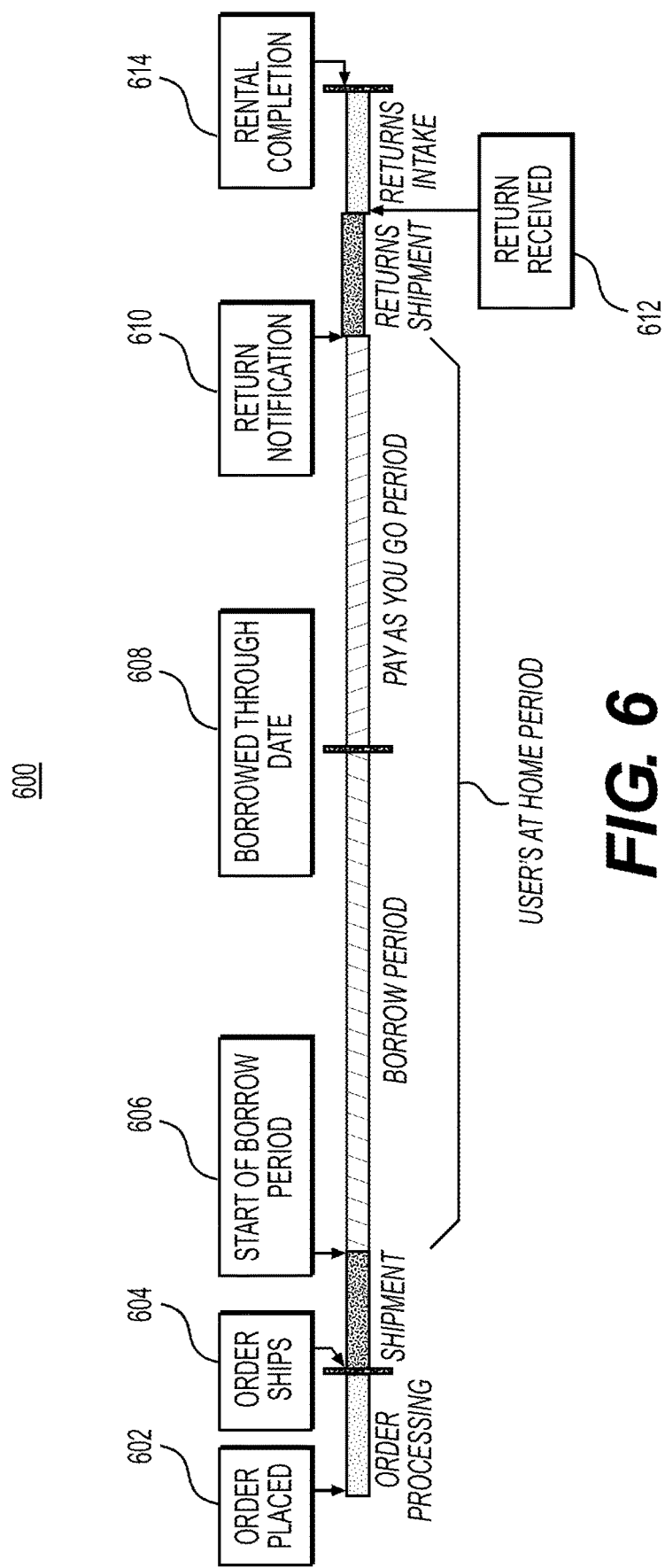
FIG. 6 is a representation of an exemplary transaction rental lifecycle, according to one or more embodiments.

FIG. 6 depicts an exemplary transaction rental lifecycle 600 according to some embodiments. As shown in FIG. 6, an order for one or more wearable articles for shipment to a user may be placed (602), thereby initiating the exemplary transaction rental lifecycle 600. For example, an order for a transaction rental of a wearable item may be placed (602). For simplicity, the exemplary transaction rental lifecycle 600 is being described with reference to a single wearable article. It is understood, however, that the exemplary transaction rental lifecycle 600 may be applied to more than one wearable article, for example, a batch of wearable articles. In some embodiments, the placed order may initiate a borrow period during which the user has agreed to borrow the wearable article. The placed order may further indicate a daily amount that the user has agreed to submit for every day that the user keeps the borrowed wearable article following the end of the borrow period. In the context of the current application, the period during which the user submits the daily amount, i.e., the period following the end of the borrow period, is referred to as a pay as you go ("pay go") period. In some embodiments, the order may be placed with a submission of a borrow amount by the user to borrow the wearable article during the borrow period.

Once the order has been placed (602), the order may be processed and the ordered wearable article may be shipped (604) to the user. The period of shipment of the ordered wearable article may vary, e.g., from 1 day to 2 weeks, depending on the weather and/or location conditions at the time of the order. In some embodiments, the borrow period of the wearable article may start (606) once the user receives the wearable article or after a predetermined number of days after the order has shipped.

As shown in FIG. 6, the user may choose to keep the wearable article for longer than the borrow period, i.e., keep the wearable article past the borrowed through date 608. In such instances, the pay go period may be triggered and the user may be required to submit the daily amount for each day the user keeps the wearable article during the pay go period. For example, status monitoring 366 microservice may monitor the wearable article while the article is with the user and initiate the pay go period based on a determination that a return notification for the wearable article has not been received by the borrowed through date 608. The return notification is described in further detail below with reference to FIGS. 8A-8G. In some embodiments, the daily amounts may be accrued and the user may submit the accrued daily amounts on a weekly basis. In some embodiments, the daily amounts may be accrued and the user may submit the accrued daily amounts at the conclusion of the pay go period, for example, when the user submits a return notification as will be described in further detail below with reference to FIGS. 8A-8G.

As shown in FIG. 6, the user may submit a return notification for the wearable article (610). In some embodiments, the user may be given a predetermined period of time (e.g., a predetermined number of days) within which to return the wearable article. This predetermined period of time may be measured from the return notification. For example, the user may be required to ship the wearable item within 7 days of the return notification. The pay go period may end as a result of the return notification. In other words, the daily amount may no longer accrue once the return notification has been submitted. In some embodiments, the transaction rental lifecycle 600 may conclude once the returned wearable article is received (612) and the return is processed and completed (614).

In some embodiments, the user may choose to purchase the wearable item during the borrow period. In such embodiments, the user may submit a purchase amount for the wearable article. The purchase amount during the borrow period may be an amount determined based on the listed amount for the wearable article. For example, the purchase amount may be a predetermined percentage of the listed amount for the wearable article.

In some embodiments, the user may choose to purchase the wearable item during the pay go period. In such embodiments, the user may submit a discounted purchase amount for the wearable article. The discounted purchase amount during the pay go period may be the amount resulting from subtracting the accrued daily amounts submitted by the user from the purchase amount. In some embodiments, a maximum purchase amount (referred to as maximum amount herein) may be determined for the purpose of calculating the discounted purchase amount. The maximum amount may be a predetermined percentage, e.g., 90%, of the listed amount. In some instances, the sum of the borrow amount and discounted purchase amount may be compared with the maximum amount. If the sum of the borrow amount and discounted purchase amount does not exceed the maximum amount, the discounted purchase amount may be charged to the user. If the sum of the borrow amount and discounted purchase amount exceeds the maximum amount, the maximum amount may be assigned as the purchase amount. In such instances, the user may be charged the amount resulting from subtracting the borrow amount from the maximum amount.

In some embodiments, the user may keep the wearable item for so long during the pay go period that the sum of the borrow amount and the accrued daily amount may equal the purchase amount. In such instances, the user may no longer be charged the daily amount and the user may be notified to keep the wearable item at no further charge.

VII. Examples of User Interfaces Associated with Transaction Rental

FIGS. 7A-7F and 8A-8G are diagrams illustrating examples of various environments 700, 800, 900 implemented via environment 100, architecture 200, and/or server system 300. Environments 700, 800, 900 may include one or more graphical elements that are presented via user device 112. These graphical elements may, for example, allow a user to interact with an electronic storefront, such as a storefront of a hosting entity 410.

Figures 7A, 7B:
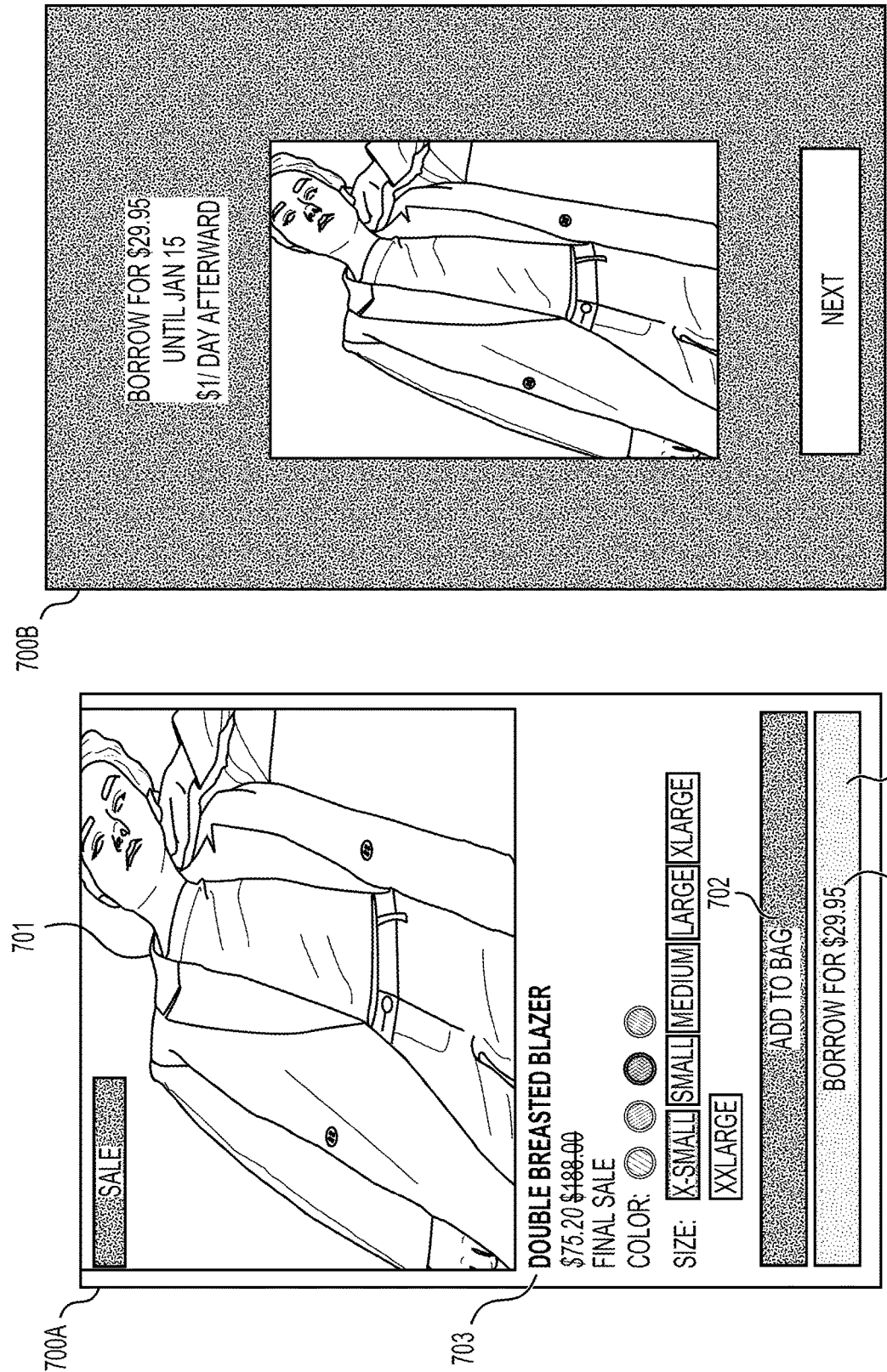

As shown in FIG. 7A, a user interacting with an electronic storefront may be presented with interface 700 depicting an article image 701 according to some embodiments. Additional article information may be presented via article description 703. The article description may include information associated with article image 701, such as style information, an article name, a style description, etc. Interface 700 may also include values, e.g., values indicative of a purchase price of article, category (e.g., style) selectors, characteristic (e.g., size) selectors, purchase call-to-action (CTA) 702, transaction rental CTA 704 (hereinafter referred to as borrow option 704), and transaction rental value 705. In the context of the current disclosure, the purchase CTA 702 may also be referred to as a purchase option, the transaction rental CTA 704 may also be referred to as a borrow option, and the transaction rental value 705 may also be referred to as the borrow amount described above. In some embodiments, the transaction rental CTA 704 may only be available for articles where inventory is available for the user to borrow. In such embodiments, the check for inventory availability may be performed as soon as the user selects the article such that the interface 700A depicted in FIG. 7A may be displayed to the user. For example, the article information may be passed via an API call to check available inventory with the response made within 100 ms of the user landing on the interface 700 depicting in FIG. 7A. The transaction rental value 705 may also be derived in real-time by passing the listed amount for the article via an API call and determining the transaction rental value 705 based on the listed amount within 100 ms.

Once the user engages with, e.g., clicks on, the borrow option 704, the interface 700B depicted in FIG. 7B may be displayed to the user. In some embodiments, once the user engages with the borrow option 704, the user may be transitioned from a tenant entity destination, e.g., website, to a fulfiller entity destination, e.g., website. For example, the user may be transitioned from a tenant entity destination, e.g., the interface 700A associated with a website displayed in FIG. 7A, to a fulfiller entity destination, e.g., the interfaces 700B-7F associated with a website displayed in FIGS. 7B-7F as will be described in further detail below. As shown in FIG. 7B, the borrow amount and the borrow period may be displayed to the user. Interface 700B may also show the daily amount for which the user would pay for each day that he or she keeps the article for longer than the borrow period. In some embodiments, the daily amount may also derived in real-time via an API call, e.g., by RT valuation 364 microservice, based on the listed amount for the article. In some embodiments, the daily amount may be determined based on a set of attributes including, for example, user data, geography, time of day, date, and/or season. When the user engages, e.g., clicks on, the displayed next button, the interface 700C of FIG. 7C or interface 700D of FIG. 7D may be displayed to the user.

In some embodiments, inventory reservation 360 microservice may be initiated to determine whether inventory for the selected article is available and reserve the selected article as a result of the user clicking on the next button. If article reservation is unsuccessful, interface 700C of FIG. 7C may be displayed to the user indicating that the selected article is currently in use by other users. In some embodiments, the user may be presented with an alternative option 702 to purchase the selected article as shown in FIG. 7C.

Figure 7D:
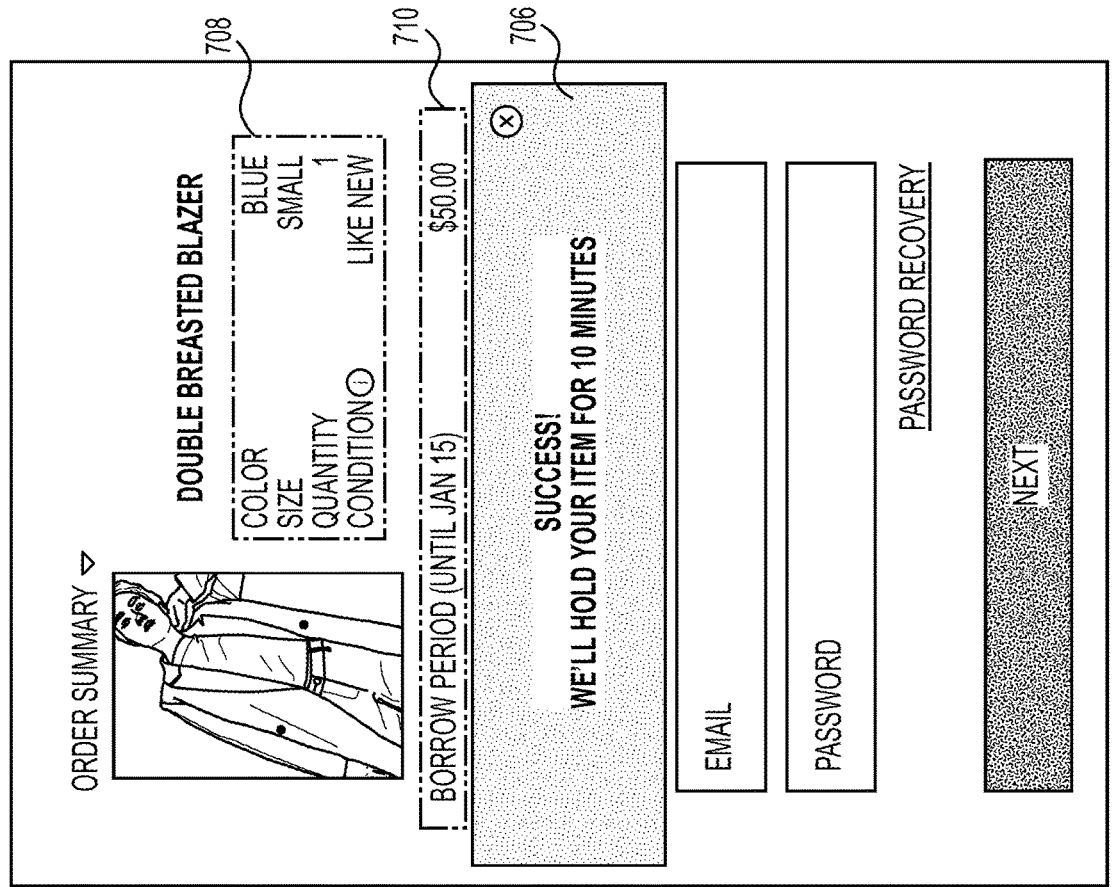
Figure 7C:
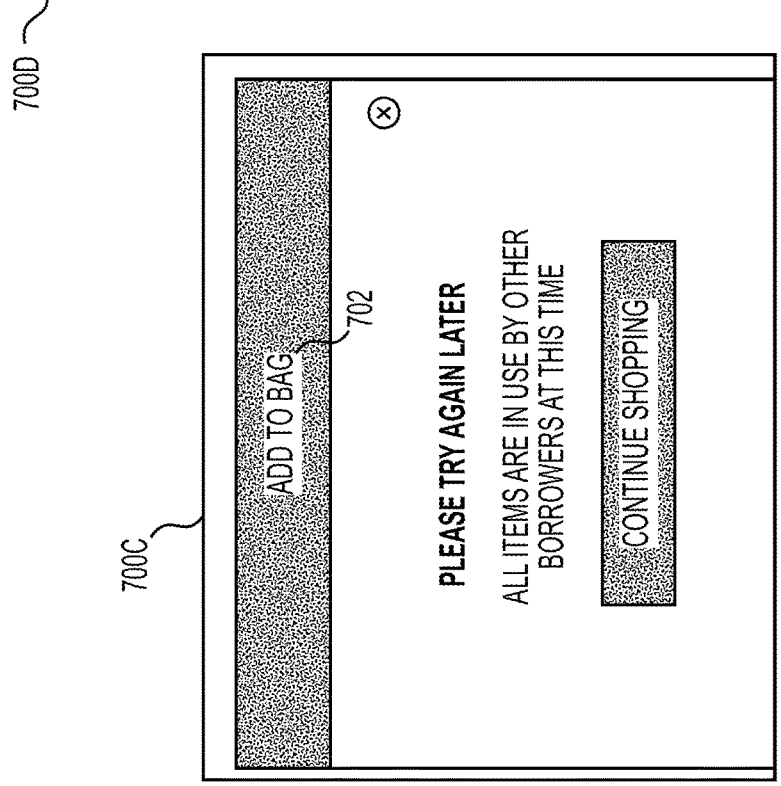

If article reservation is successful, the interface 700D depicted in FIG. 7D may be displayed to the user. As shown in FIG. 7D, a reservation success panel 706 may be displayed to the user along with the order summary. The reservation success panel 706 may indicate that the selected article will be reserved for a predetermined period of time, e.g., 10 minutes. The order summary may include information 708 regarding the selected article and the borrow information 710, e.g., the borrow period and the borrow amount. For example, the information 708 may include the color, size, quantity, and/or condition of the article.

As shown in FIG. 7E, the reservation success panel 706 may convert to a reservation timer banner 712 at the top of the user interface 700E. The user must successfully process the order within the reserved time indicated in the reservation timer banner 712. In some embodiments, the reservation timer banner 712 may flash and/or change to a different color when there is a predetermined period of time remaining (e.g., one minute) for the reserved period. The reservation time banner 712 may stay at the top of the user interface 700E as the user processed the order to borrow the article. It is understood that the reservation time banner 712 is described as positioned at the top of the user interface 700E for ease of explanation only, and that the reservation time banner 712 may be positioned in any location on the user interface 700E in other embodiments. Similarly, the time reservation banner 712 is not restricted to a banner format and may take and shape and size in other embodiments. If the reservation time expires before the user completes the order, a notification 716 is generated for the user to start the process over again as shown in FIG. 7F. In some embodiments, the user may have set up his or her account information, payment, and shipment details. In such embodiments, the set up information may autofill for the user.

Figure 8B:
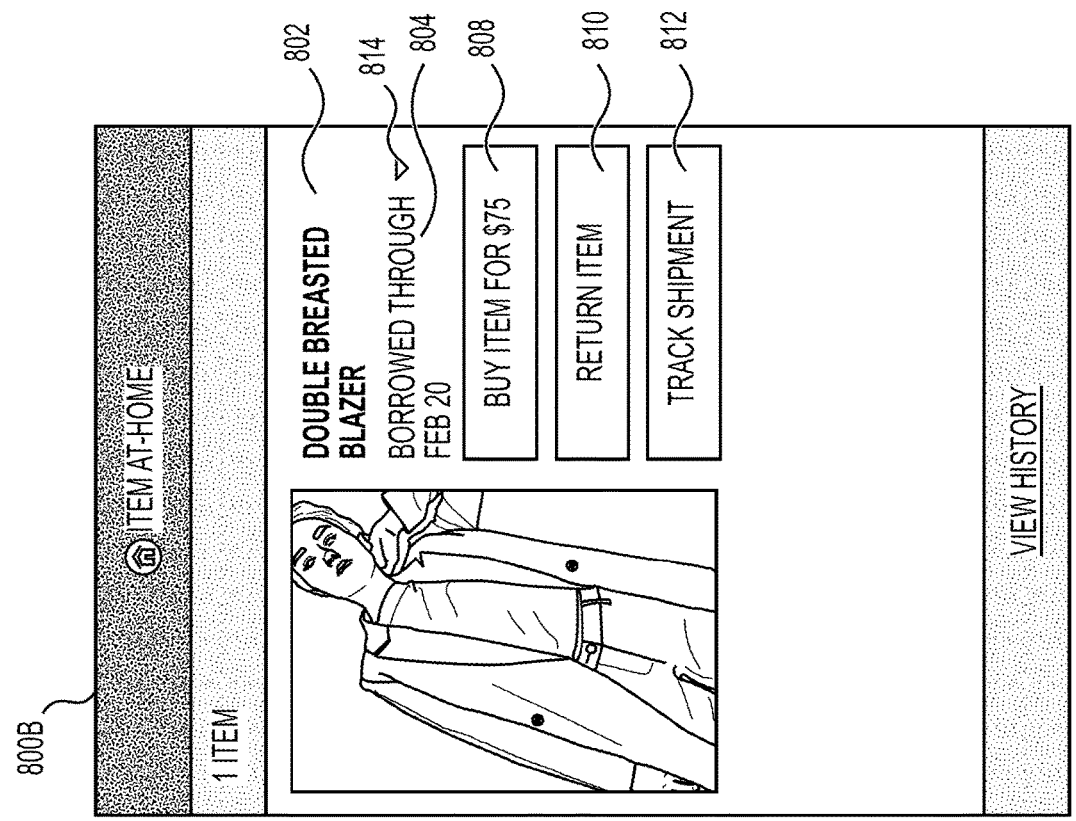
Figure 8A:
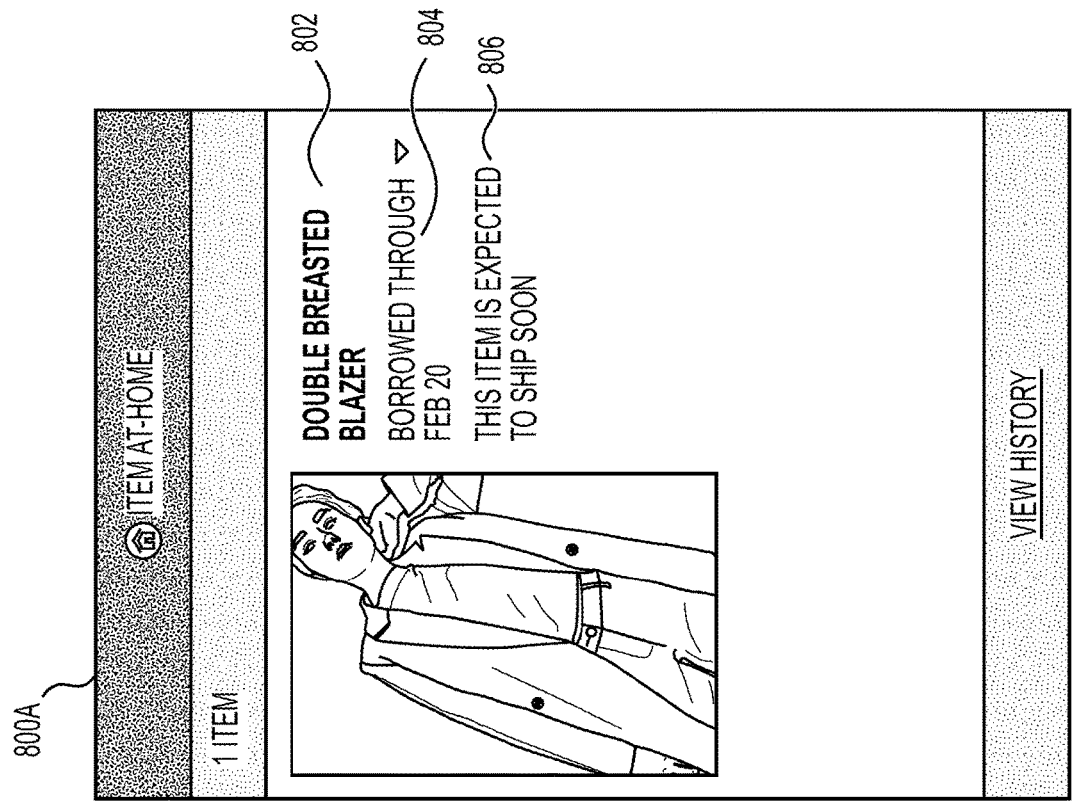
Figure 8D:
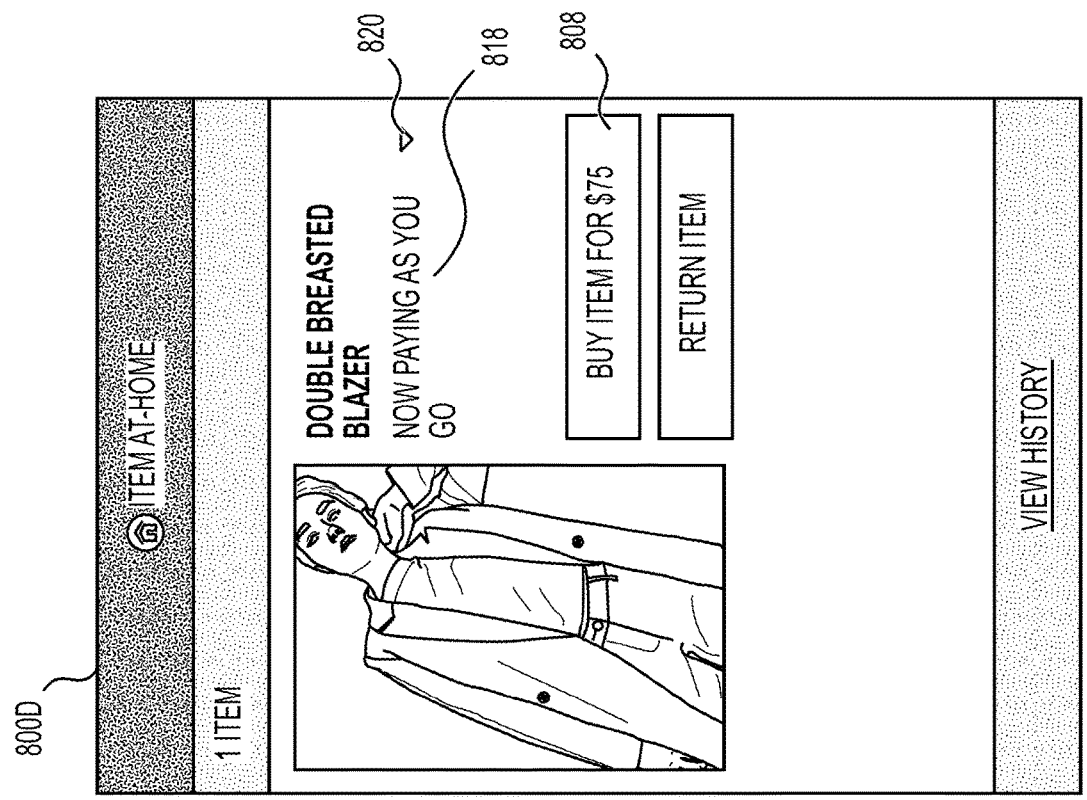

A user that has placed an order, as described above with reference to FIGS. 6-7F, may be presented with user interfaces 800 depicted in FIGS. 8A-8F indicating the status of the ordered article according to some embodiments. User interfaces 800 depicted in FIGS. 8A-8F show examples of interfaces indicating current status information associated with a transaction rental order according to some embodiments. As shown in FIG. 8A, user interface 800A may indicate that the user has ordered an article 802, e.g. a double breasted blazer, and a borrow period 804 for borrowing the ordered article. User interface 800A may further indicate a current status of shipment 806 for the article. For example, the current status of shipment 806 for the article may be that the order is expected to ship soon. It is understood that the user may use account information that he or she used to place the order to access the information displayed in FIGS. 8A-8G.

Figure 8C:
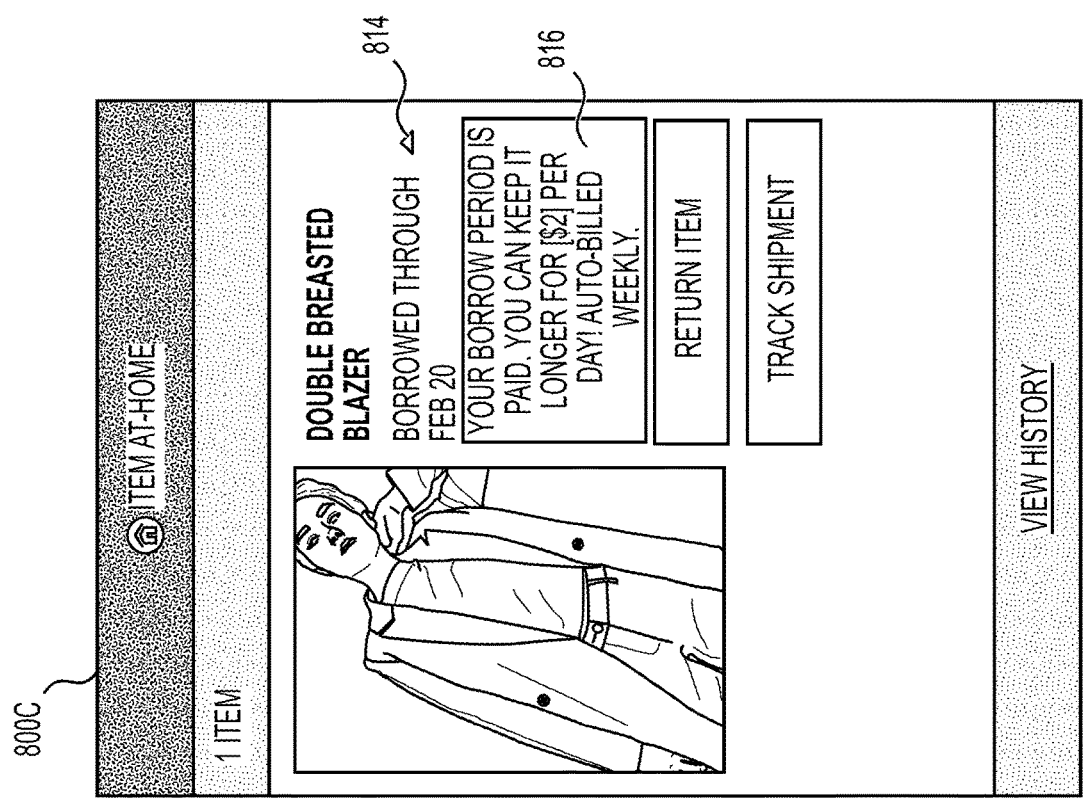

FIG. 8B depicts an example interface 800B when the ordered article has shipped. As shown in FIG. 8B, interface 800B may indicate the ordered article 802 and the borrow period 804. Additionally, interface 800B displays purchase option 808 (e.g., purchase CTA 702) with a purchase amount. Interface 800B may also display a return notification option 810. The user may engage with, e.g., click on, the return notification option 810 to return the ordered article. The user may utilize the return notification option at any time during the borrow period or the pay go period and thus may choose to return the article at any time during the borrow or pay go periods. Interface 800B may further display a track shipment option 812 to track the progress of the shipment. In some embodiments, user interface 800B may further indicate an expected delivery date of the shipment. In some embodiments, a drop down button 814 may be positioned next to the borrow period indication 814. By engaging with the drop down button 814, a borrow period status panel 816 may be displayed to the user as shown in user interface 800C depicted in FIG. 8C. As shown in FIG. 8C, the borrow period status panel 816 may indicate that the borrow amount has been submitted in full. Additionally, the borrow period status panel 816 may indicate a daily amount for the article that may be charged for every day the user keeps the article beyond the borrow period. In such instances the borrow period status panel 816 may further indicate that an accrued daily amount may be charged to the user on a weekly basis.

As described above with reference to FIG. 6, the user may enter a pay go period if the user keeps the article beyond the borrow period. In such instances, user interface 800D of FIG. 8D may be displayed to the user. User interface 800D may display a pay go status 818 along with a drop down button 818 positioned next to the pay go status 818. By engaging with the drop down button 818, a pay go status panel 820 may be displayed to the user as shown in user interface 800E depicted in FIG. 8E. As shown in FIG. 8E, the pay go status panel 820 may indicate that the user is currently in the pay go period and that the user is being charged the determined daily amount for every day during the pay go period. The pay go status panel 820 may further indicate that the user is being charged on a regular basis (e.g., weekly) and display the current accrued daily amount owed by the user.

The user may return the article at any time during the borrow period or the pay go period. For example, the user may utilize the return notification option 810 displayed in any of the interfaces depicted in FIGS. 8B-8G. In some embodiments, the user may be prompted to provide feedback regarding the article upon use of the return notification option 810. For example, the user may be asked (i) whether the user wore the article, (ii) why the user did not wear the article if he or she did not wear the article, (iii) how the article fit if the user wore the article, and/or (iv) how the user would rate the article. In some embodiments, the user may be in the pay go period when he or she utilizes the return notification option 810. In some instances, there may be an outstanding accrued daily amount owed by the user. In such instances, the user may be required to submit the outstanding amount to complete the return notification. The daily amount may no longer charged to the user once the user has submitted the outstanding amount and completed the return notification. The user may then be required the ship the returned article within a predetermined number days of the completed return notification.

Similarly, the user may choose to purchase the article at any time during the borrow period or the pay go period by utilizing the purchase option 808. As described above with reference to FIG. 6, the purchase amount may vary depending on whether the user is in the borrow period or the pay go period. For example, the user may be displayed the purchase option 808 along with the purchase amount for the article during the borrow period. As another example, the user may be displayed the purchase option 808 along with the discounted purchase amount during the pay go period.

In some embodiments, the user may have kept the article for so long that the submitted daily amounts may cover the purchase amount for the article. For example, the user may keep the wearable item for so long during the pay go period that the sum of the borrow amount and the accrued daily amount may equal the purchase amount. In such embodiments, the user may be encouraged to keep the article as shown in user interface 800F of FIG. 8F. User interface 800F displays a notification 822 to the user that the article is now available for the user to keep. User interface 800F also displays a status of article 824 indicating that the article is now available for the user to keep. In some embodiments, a drop down button 826 may be displayed along with the status of the article 824. By engaging with the drop down button 826, a keep it status panel 828 may be displayed to the user as shown in user interface 800G depicted in FIG. 8G. The keep it status panel 828 may provide details regarding how the daily amounts submitted by the user covers the purchase amount of the article as shown in FIG. 8G.

VIII. Exemplary Method for Providing a User Interface to a User

Figure 9:
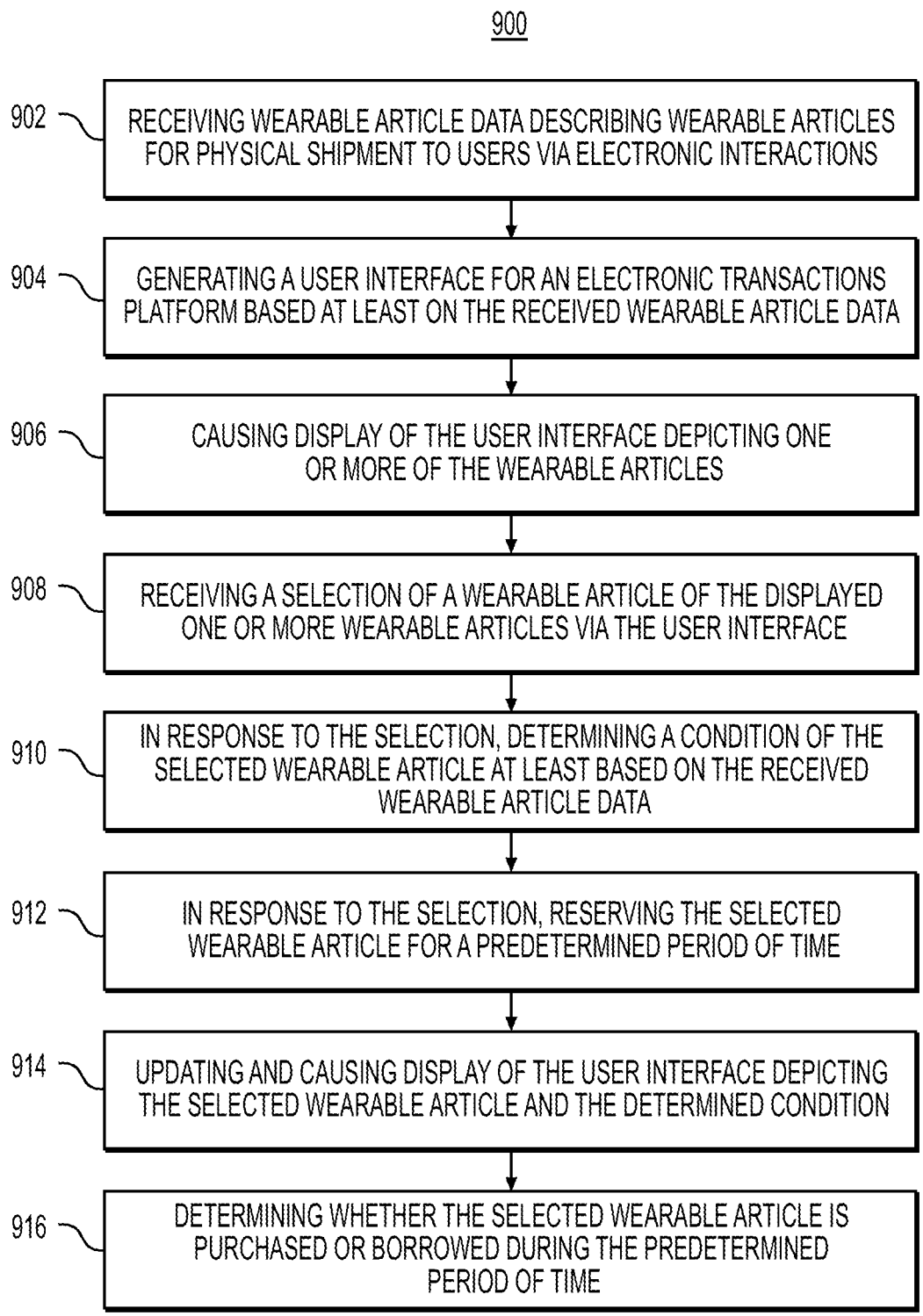
FIG. 9 is a flowchart of an exemplary method for providing a user interface to a user, according to one or more embodiments.

FIG. 9 is a flowchart showing an exemplary method 900 for providing a user interface to a user, according to one or more embodiments. It is understood that the exemplary method 900 may be performed, at least in part, by a server system (e.g., server system 102 or server system 300). Method 900 may begin with step 902 in which the server system (e.g., server system 102 or server system 300) may receive wearable article data describing wearable articles for physical shipment to users via electronic interactions. In some embodiments, the wearable article data may be received from one or more electronic entity interfaces, wherein the one or more electronic entity interfaces may be accessible over one or more networks.

In step 904, the server system (e.g., server system 102 or server system 300) may generate a user interface for an electronic transactions platform based at least on the received wearable article data. In some embodiments, the method may include a further step of obtaining data including identification data of at least one user of the electronic transactions platform, the identification data including demographic data, previous purchase data, and/or previous borrow data of the at least one user. In such embodiments, the user interface may be updated based on the obtained data.

In step 906, the server system (e.g., server system 102 or server system 300) may cause display of the user interface depicting one or more of the wearable articles.

In step 908, the server system (e.g., server system 102 or server system 300) may receive a selection of a wearable article of the displayed one or more wearable articles via the user interface. In some embodiments, the generated user interface may include an option to borrow the selected wearable article and/or an option to purchase the selected wearable article. In some embodiments, the server system (e.g., server system 102 or server system 300) may determine an availability of the selected wearable article for physical shipment in response to the selection. In some embodiments, the updated user interface may further depict the determined availability of the selected wearable article for physical shipment.

In step 910, the server system (e.g., server system 102 or server system 300) may determine a condition of the selected wearable article at least based on the received wearable article data in response to the selection.

In step 912, the server system (e.g., server system 102 or server system 300) may reserve the selected wearable article for a predetermined period of time in response to the selection. In some embodiments, the method 900 may include a further step of updating and causing display of the interface to indicate a remaining amount of time for the predetermined period of time as a result of reserving the selected wearable article for the predetermined period of time.

In step 914, the server system (e.g., server system 102 or server system 300) may update and cause display of the user interface depicting the selected wearable article and the determined condition. In some embodiments, updating and causing display of the user interface may include displaying a period for borrowing the selected wearable article upon selection of the borrow option.

In step 916, the server system (e.g., server system 102 or server system 300) may determine whether the selected wearable article is purchased or borrowed during the predetermined period of time. In some embodiments, the server system (e.g., server system 102 or server system 300) may release the reserved selected wearable article for other users as a result of determining that the selected wearable article is not purchased or borrowed during the predetermined period of time.

Although FIG. 9 shows example blocks of an exemplary method 900, in some implementations, the exemplary method 900 may include additional blocks, fewer blocks, different blocks, or differently arranged blocks than those depicted in FIG. 9. Additionally, or alternatively, two or more of the blocks of the exemplary method 900 may be performed in parallel.

Figure 10:
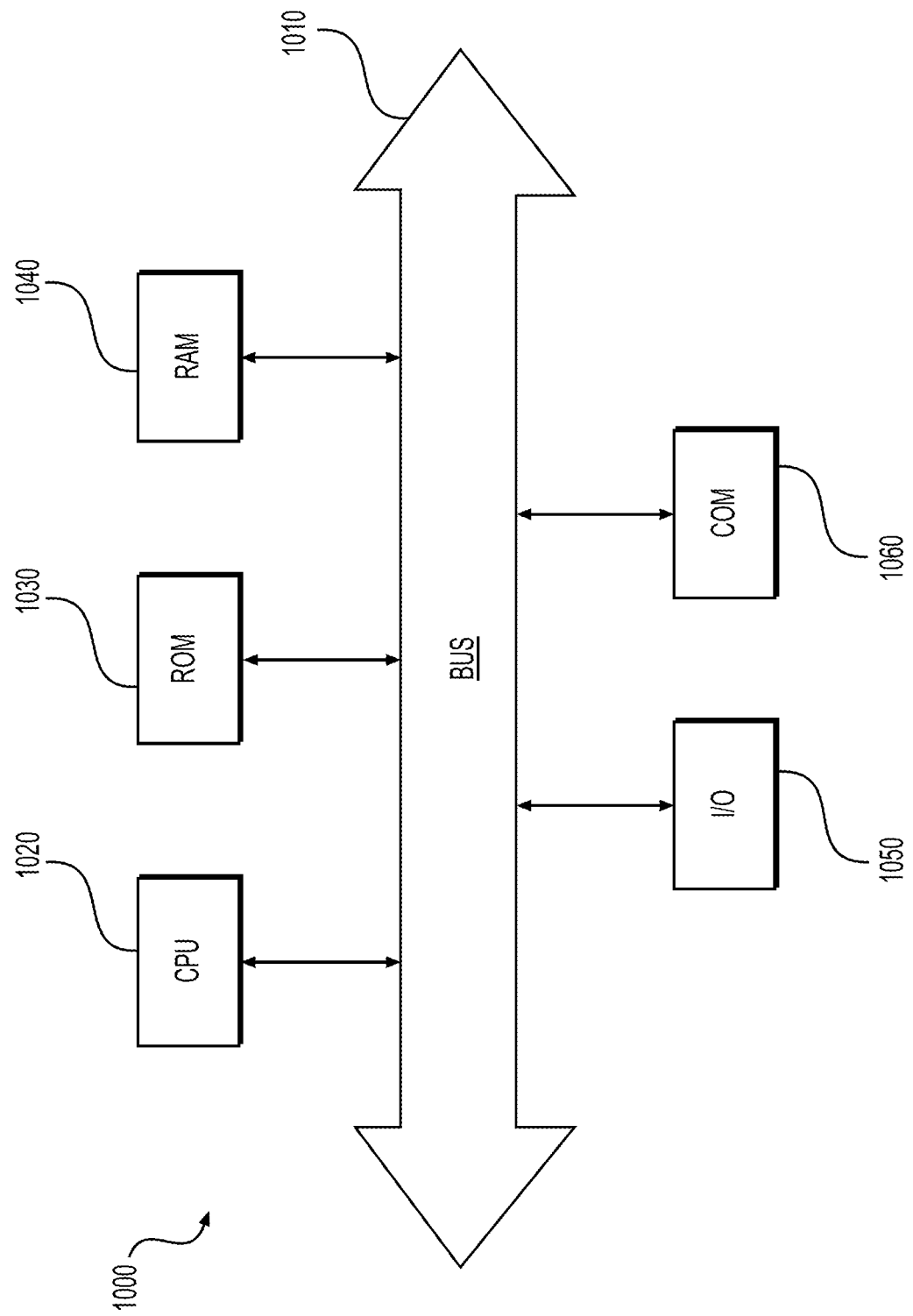
FIG. 10 depicts an exemplary computer device or system, in which embodiments of the present disclosure, or portions thereof, may be implemented.

FIG. 10 depicts an exemplary computer device or system, in which embodiments of the present disclosure, or portions thereof, may be implemented. In some implementations, server system 102, user devices 112, employee devices 116, entity devices 118, 132, and/or 142, entity devices 202, user devices 204, internal system 206, external systems 212, server system 300, and/or any other computer system or user terminal for performing the various embodiments of the present disclosure, may correspond to device 1000. Additionally, each of the exemplary computer servers, databases, user interfaces, modules, and methods described above with respect to FIGS. 1-9 can be implemented in device 1000 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-9.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-9, may be implemented using a processor device 1100. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 10, a device 1000 used for performing the various embodiments of the present disclosure (e.g., server system 102, user devices 112, employee devices 116, entity devices 118, 132, 142, entity devices 202, user devices 204, the internal system 206, the external system(s) 212, server system 300, and/or any other computer system or user terminal for performing the various embodiments of the present disclosure) may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

A device 1000 (e.g., server system 102, user devices 112, employee devices 116, entity devices 118, 132, 142, entity devices 202, user devices 204, internal system 206, external system(s) 212, server system 300, and/or any other computer system or user terminal for performing the various embodiments of the present disclosure) may also include a main memory 1040, for example, random access memory (RAM), and may also include a secondary memory 1030. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable (e.g., computer-readable) storage medium having stored therein computer software and/or data (e.g., instructions).

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

A device 1000 may also include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for providing a user interface to a user for an electronic transactions platform, the method comprising:
    receiving, by one or more processors, wearable article data from one or more electronic entity interfaces corresponding to one or more entities, the wearable article data describing one or more wearable articles for physical shipment to the user;
    initiating an API call to an external system to retrieve one or more current valuations for each of the one or more wearable articles and determining one or more transaction values according to the one or more current valuations;
    displaying, by the one or more processors, the one or more wearable articles and the one or more transaction values on the user interface for the electronic transactions platform;
    receiving, by the one or more processors, a selection of a wearable article of the displayed one or more wearable articles via the user interface;
    reserving, by the one or more processors, the selected wearable article for a predetermined period of time;
    determining, by the one or more processors, whether the selected wearable article is selected for a permanent use or a temporary use;
    in response to determining that the selected wearable article is selected for the permanent use or the temporary use, displaying, by the one or more processors, a current status user interface indicating current status information associated with the selected wearable article, the current status information including a current shipment status for the selected wearable article;
    in response to determining that the selected wearable article has shipped to the user, displaying, by the one or more processors, a borrow period status panel; and
    in response to receiving a selection of the borrow period status panel, displaying, by the one or more processors, an assessed value associated with the user for a daily or weekly period of time.

2. The computer-implemented method of claim 1, the method further comprising:
    obtaining, by the one or more processors, identification data of at least one user of the electronic transactions platform, the identification data including at least one of demographic data, previous purchase data, or previous borrow data of the at least one user; and
    updating, by the one or more processors, the user interface based on the obtained identification data.

3. The computer-implemented method of claim 1, the method further comprising:
    in response to determining that the selected wearable article is not purchased or borrowed during the predetermined period of time, releasing, by the one or more processors, the reserved selected wearable article for other users.

4. The computer-implemented method of claim 1, wherein the user interface includes at least one of an option to borrow the selected wearable article or an option to purchase the selected wearable article.

5. The computer-implemented method of claim 1, the method further comprising:
    as a result of reserving the selected wearable article for the predetermined period of time, updating and causing display of the current status user interface to indicate a remaining amount of time for the predetermined period of time.

6. The computer-implemented method of claim 1, wherein the current status information includes the current shipment status, a borrow period, a purchase option and a corresponding purchase amount, and a return notification.

7. The computer-implemented method of claim 1, wherein the external system includes a data analytics system for collecting data and analytics associated with the one or more entities.

8. The computer-implemented method of claim 1, the method further comprising:
    modifying, by the one or more processors, the one or more transaction values based on a set of attributes including at least one of: user data, user geography, a time of day, a date, or a season.

9. A computer system for providing a user interface to a user for an electronic transactions platform, the computer system comprising:
    a memory having processor-readable instructions stored therein; and
    one or more processors configured to access the memory and execute the processor-readable instructions, which when executed by the one or more processors configures the one or more processors to perform a plurality of functions, including functions for:
        receiving wearable article data from one or more electronic entity interfaces corresponding to one or more entities, the wearable article data describing one or more wearable articles for physical shipment to the user;
        initiating an API call to an external system to retrieve one or more current valuations for each of the one or more wearable articles and determining one or more transaction values according to the one or more current valuations;
        displaying the one or more wearable articles and the one or more transaction values on the user interface for the electronic transactions platform;
        receiving a selection of a wearable article of the displayed one or more wearable articles via the user interface;
        reserving the selected wearable article for a predetermined period of time;
        determining whether the selected wearable article is selected for a permanent use or a temporary use during the predetermined period of time;
        in response to determining that the selected wearable article is selected for the permanent use or the temporary use during the predetermined period of time, displaying a current status user interface indicating current status information associated with the selected wearable article, the current status information including a current shipment status for the selected wearable article;
        in response to determining that the selected wearable article has shipped to the user, displaying a borrow period status panel; and
        in response to receiving a selection of the borrow period status panel, displaying an assessed value associated with the user for a daily or weekly period of time.

10. The computer system of claim 9, the functions further comprising:

modifying the one or more transaction values based on a set of attributes including at least one of: user data, user geography, a time of day, a date, or a season.

11. The computer system of claim 9, the functions further comprising:
obtaining identification data of at least one user of the electronic transactions platform, the identification data including at least one of demographic data, previous purchase data, or previous borrow data of the at least one user; and
updating the user interface based on the obtained identification data.

12. The computer system of claim 9, the functions further comprising:
in response to determining that the selected wearable article is not purchased or borrowed during the predetermined period of time, releasing the reserved selected wearable article for other users.

13. The computer system of claim 9, wherein the user interface includes at least one of an option to borrow the selected wearable article or an option to purchase the selected wearable article.

14. The computer system of claim 9, the functions further comprising:
as a result of reserving the selected wearable article for the predetermined period of time, updating and causing display of the current status user interface to indicate a remaining amount of time for the predetermined period of time.

15. A non-transitory computer-readable medium containing instructions for providing a user interface to a user for an electronic transactions platform, the instructions enabling one or more processors to perform operations comprising:
receiving wearable article data from one or more electronic entity interfaces corresponding to one or more entities, the wearable article data describing one or more wearable articles for physical shipment to the user;
initiating an API call to an external system to retrieve one or more current valuations for each of the one or more wearable articles and determining one or more transaction values according to the one or more current valuations;
displaying the one or more wearable articles and the one or more transaction values on the user interface for the electronic transactions platform;
receiving a selection of a wearable article of the displayed one or more wearable articles via the user interface;
reserving the selected wearable article for a predetermined period of time;
determining whether the selected wearable article is selected for a permanent use or a temporary use;
in response to determining that the selected wearable article is selected for the permanent use or the temporary use, displaying a current status user interface indicating current status information associated with the selected wearable article, the current status information including a current shipment status for the selected wearable article;
in response to determining that the selected wearable article has shipped to the user, displaying a borrow period status panel; and
in response to receiving a selection of the borrow period status panel, displaying an assessed value associated with the user for a daily or weekly period of time.

16. The non-transitory computer-readable medium of claim 15, the operations further comprising:
modifying the one or more transaction values based on a set of attributes including at least one of: user data, user geography, a time of day, a date, or a season.

17. The non-transitory computer-readable medium of claim 15, the operations further comprising:
obtaining identification data of at least one user of the electronic transactions platform, the identification data including at least one of demographic data, previous purchase data, or previous borrow data of the at least one user; and
updating the user interface based on the obtained identification data.

18. The non-transitory computer-readable medium of claim 15, the operations further comprising:
in response to determining that the selected wearable article is not purchased or borrowed during the predetermined period of time, releasing the reserved selected wearable article for other users.

19. The non-transitory computer-readable medium of claim 15, wherein the user interface includes at least one of an option to borrow the selected wearable article or an option to purchase the selected wearable article.

20. The non-transitory computer-readable medium of claim 15, the operations further comprising:
as a result of reserving the selected wearable article for the predetermined period of time, updating and causing display of the current status user interface to indicate a remaining amount of time for the predetermined period of time.

* * * * *